(12) United States Patent
Bosteels

(10) Patent No.: US 7,188,470 B2
(45) Date of Patent: Mar. 13, 2007

(54) COMBUSTION PROCESS

(76) Inventor: Dominique Bosteels, Carrigmore 5, Carrigaline, Co Cork (IE)

(*) Notice: Subject to any disclaimer, the term of this patent is extended or adjusted under 35 U.S.C. 154(b) by 234 days.

(21) Appl. No.: 10/268,629

(22) Filed: Oct. 10, 2002

(65) Prior Publication Data

US 2003/0234012 A1    Dec. 25, 2003

Related U.S. Application Data

(60) Provisional application No. 60/328,352, filed on Oct. 10, 2001.

(51) Int. Cl.
*F01N 3/10* (2006.01)

(52) U.S. Cl. .................... 60/299; 60/301; 423/213.2; 123/670

(58) Field of Classification Search .............. 60/274, 60/299, 301; 423/213.2, 239.1, 239.2; 431/5, 431/7, 170, 326, 328, 329; 502/302, 304; 123/670
See application file for complete search history.

(56) References Cited

U.S. PATENT DOCUMENTS

| | | | |
|---|---|---|---|
| 1,564,906 A * | 12/1925 | Sokal | 123/143 R |
| 2,978,360 A * | 4/1961 | Bradstreet et al. | 123/669 |
| 3,923,011 A * | 12/1975 | Pfefferle | 123/1 R |
| 4,011,839 A * | 3/1977 | Pfefferle | 123/1 R |
| 4,811,701 A | 3/1989 | Buhl et al. | |
| 4,844,028 A | 7/1989 | Volcher | |
| 4,972,811 A * | 11/1990 | Baresel et al. | 123/143 B |
| 4,991,395 A | 2/1991 | Markou et al. | |
| 5,307,772 A | 5/1994 | Rao et al. | |
| 5,425,236 A * | 6/1995 | Haerle | 60/302 |
| 5,494,015 A | 2/1996 | Rynhart | |
| 5,946,917 A | 9/1999 | Hums et al. | |

FOREIGN PATENT DOCUMENTS

| | | |
|---|---|---|
| EP | 0006687 | 1/1980 |
| EP | 0461347 | 12/1991 |
| EP | 1215272 | 6/2002 |
| FR | 2731009 | 2/1995 |
| GB | 211936 | 2/1924 |
| GB | 1504952 | 3/1978 |

OTHER PUBLICATIONS

Heywood, John B., Internal Combustion Engine Fundamentals, p. 653.
Unknown, Notice D'Instructions Et De Montage Pour Tous Moteurs, pp. 1-11.

* cited by examiner

Primary Examiner—Thomas Denion
Assistant Examiner—Diem Tran

(57) ABSTRACT

The combustion process is carried out in presence of a primary catalyst coating which is treated when required by means of cerium/europium compound in presence of water vapor and advantageously in presence of a refractory material, such as a clay, a hydrated clay.

29 Claims, 16 Drawing Sheets

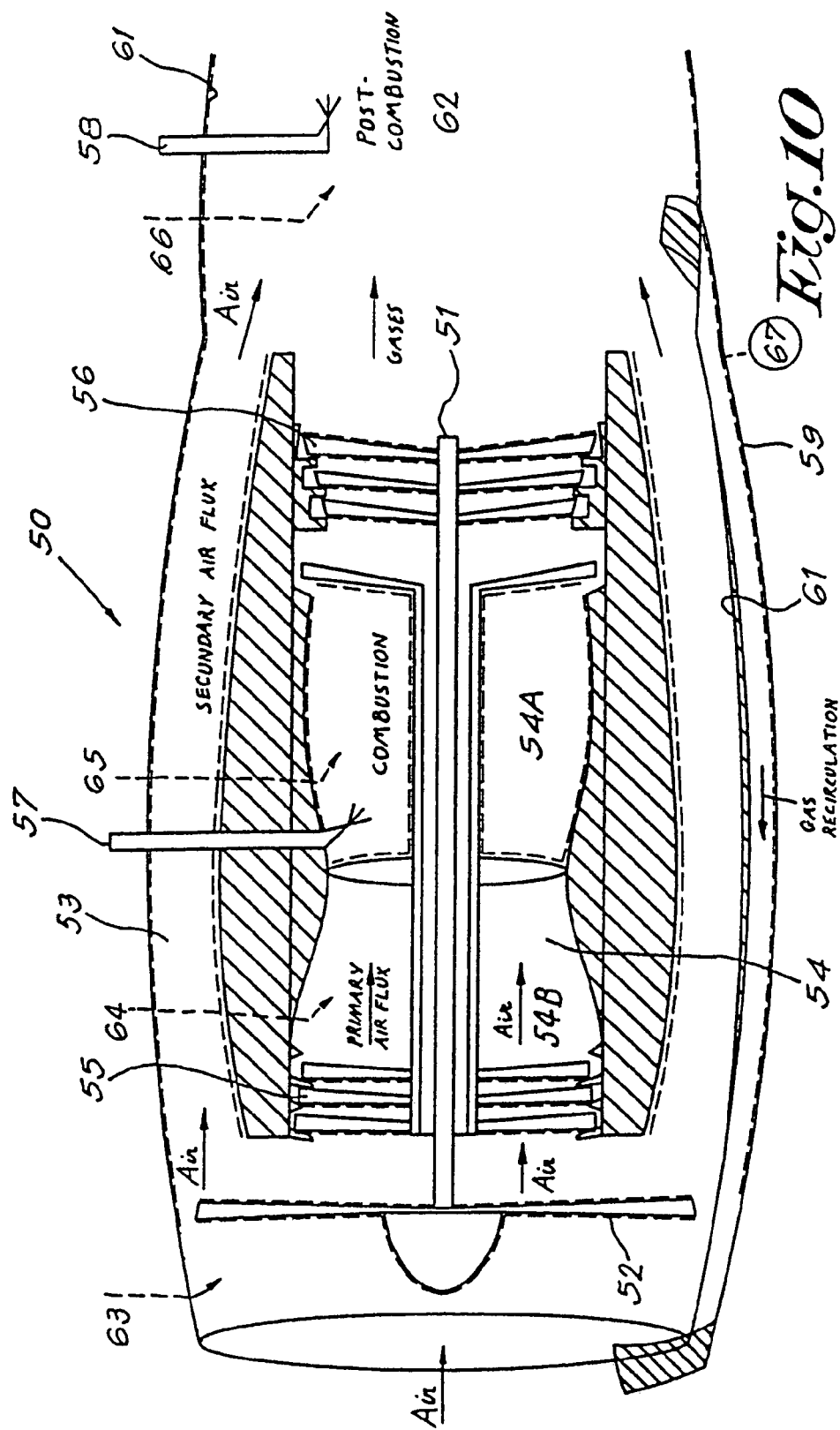

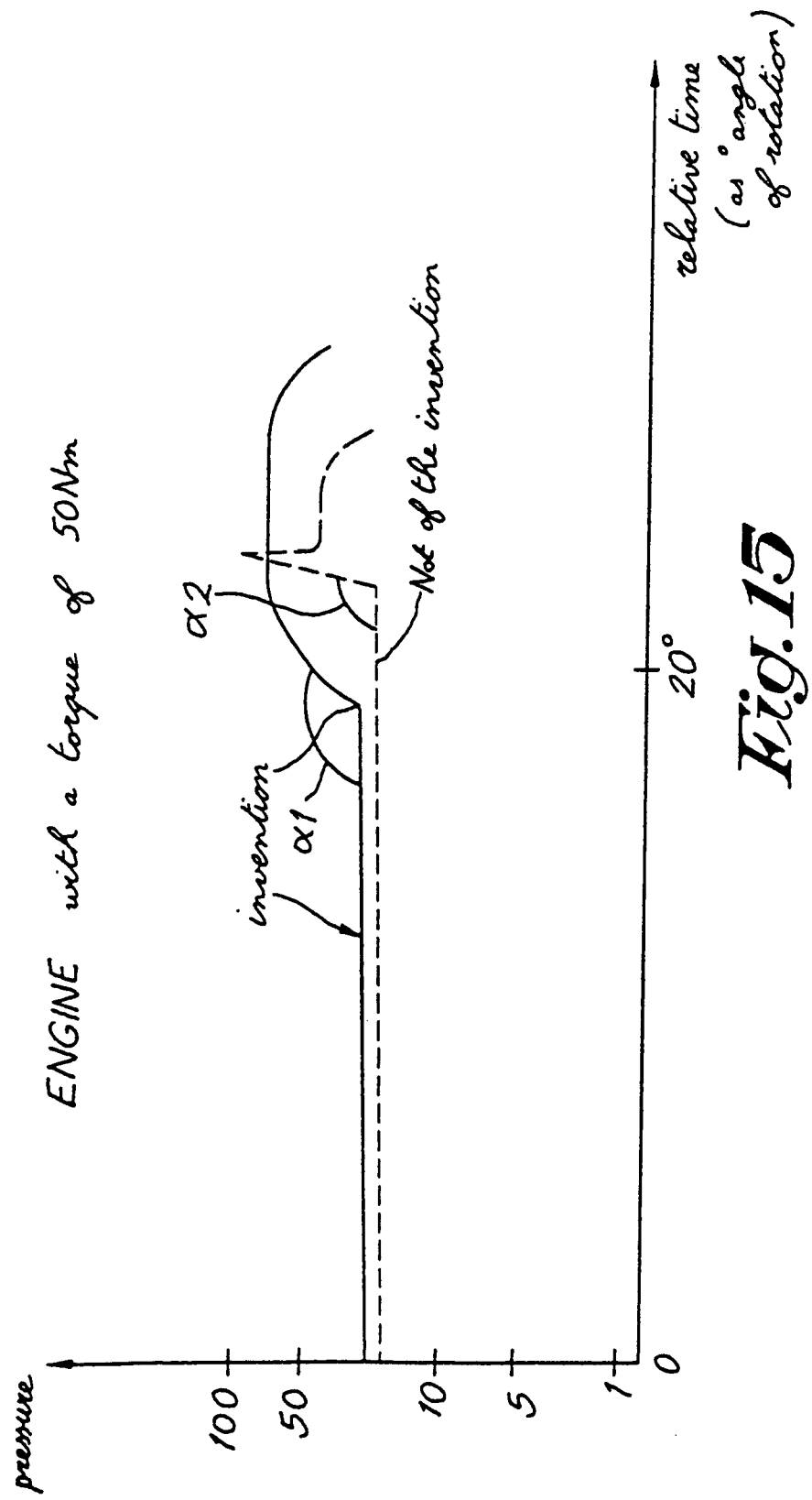

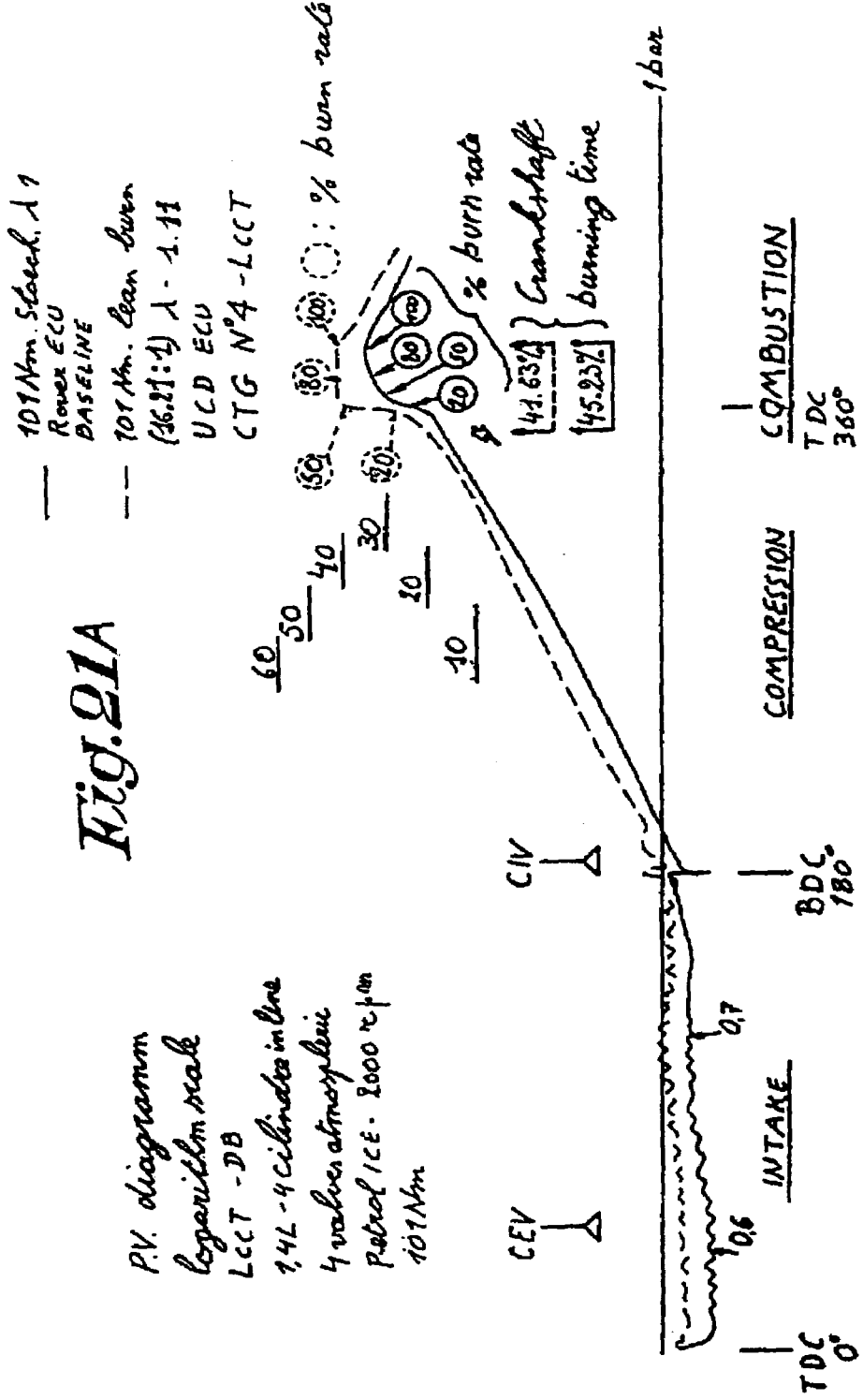

COMBUSTION PROCESS

CROSS REFERENCE TO RELATED APPLICATION

This application claims the benefit of U.S. Provisional Application No. 60/328,352 filed in the United States Patent Office on Oct. 10, 2001

FIELD OF THE INVENTION

The present invention relates to a process of combustion of a material in presence of a catalyst so as to reduce the $NO_x$ emission.

THE PRIOR ART

It has already been proposed to use catalyst in explosion motor or in combustion chamber so as to reduce the formation of $NO_x$.

As stated in Internal combustion Engine Fundamentals—J. B. Heywood—Mc Graw-Hill, 1988, "while it is not too difficult to prepare catalyst that are highly effective when fresh, it is much more difficult to maintain effectiveness over extended mileage (50,000 miles)".

For example, UK 211 936 (Sokal) discloses the use of a metallic oxide in a coating applied to the wall of the combustion chamber of an internal combustion motor. The coating is for example aluminum oxide or cerium oxide, combined with a refractory and inert substance. During the working of the internal motor, the efficiency of the catalyst starts to decrease, due to loss of catalyst particles, and up build of carbon deposit, etc. After a minimal mileage, the catalyst is no longer efficient for reducing efficiently the $NO_x$ content of the combustion gases.

U.S. Pat. No. 5,307,772 (Ford) discloses a catalyst impregnated prechamber insert operating in fuel rich environments of internal combustion engines. The insert is comprised of a ceramic impregnated with a catalyst for reducing the formation of $NO_x$. During the working of the engine, the efficiency of the catalyst starts to decrease, whereby after a certain mileage, the impregnated ceramic has a low efficiency or has no efficiency.

U.S. Pat. No. 4,811,701 (Daimler) discloses a valve provided with a catalytic coating. During the working of the engine, the efficiency of the catalyst starts to decrease, whereby after a certain mileage, the catalyst has a low efficiency or has no efficiency.

U.S. Pat. No. 5,946,917 (Siemens) discloses a catalytic combustion chamber of a burner, said combustion chamber being provided with a catalytically active coating After a certain working of the burner, the efficiency of the catalyst decreases.

U.S. Pat. No. 4,844,028 (Volcher) discloses the admission of water vapor in the air admission, said humidified air contacting a lanthanide/actinide containing catalyst before being admitted in the combustion chamber of a cylinder. The $NO_x$ reduction efficiency is low for a mileage of 0 to 5,000 km and reaches thereafter an efficiency varying greatly. Even if some lanthanide/actinide could possibly coat wall of the combustion chamber, said coating has an efficiency which is quite variable, whereby the $NO_x$ reducing effect is variable.

UK 1,504,952 discloses a method and an apparatus for reducing pollution. In said method, water vapor is admitted in the air intake venturi, before the throttle valve. A cerium screen is placed adjacent to the throttle valve. According to said patent, the introduction of steam into the intake manifold of an internal combustion engine results in almost complete absence of nitrogen oxides and carbon monoxide in the exhaust gases. As stated in said document, the efficiency of reduction of pollution is more due to the water vapor admission, the cerium screen providing no extra benefit for the reduction of pollution.

U.S. Pat. No. 4,991,395 (Markou) disclosed a method in which air (humidified and then heated) contacts a cerium containing catalyst, said air being added in the air admission. Due to the heating step, the air is far away from the saturation, whereby the air is poorly charged with cerium. The efficiency of a motor provided with such a device is very low for a mileage of about 5,000 km, while being low thereafter. Moreover, the efficiency is quite variable and unpredictable. A commercial system (Celcat®) using dry cerium containing powder is known. When using dry cerium containing powder, the problem of clogging exists at the place where the powder has to be admitted. Moreover, the efficiency of a motor provided with such a device is very low for a mileage of about 5,000 km, while being variable, low and unpredictable thereafter. According to the commercial document of the Celcat® system, the cerium containing powder in the motor has only a cleaning effect and a carbon removal effect on the motor. No catalytic effect in the combustion was observed by using said commercial system.

For solving the problem of U.S. Pat. Nos. 4,844,028, 4,991,395 and the Celcat system (namely low and unpredictable (variable) efficiency for a mileage of about 5,000 km and highly variable efficiency thereafter), the man skilled in the art would possibly try to increase the intake of additives in the combustion chamber. However, if he had done so, he would be faced with an environmental problem namely the exhaust of a too large amount of additive particles, and with a clogging problem of particles in the combustion chamber (for example at the spark plug), said clogging problem could be a cause of problem when starting the engine.

Finally, FR 2,731,009 (Rhone Poulenc) discloses a cerium containing fuel. When using such a fuel, the $NO_x$ reduction efficiency is low for at least 5,000 km. The cerium particles present in the fuel have tendency to be exhausted with the combustion gases, whereby for avoiding environmental problem, specific and costly trap systems need to be used. In said document, reference is made to a corrosion pretreatment of the motor by using a cerium containing fuel. However, such a corrosion pretreatment for being effective requests a minimum mileage of about 5,000 km. Moreover, such a pretreatment step is not suitable for having an efficient cerium coating in the cylinder.

In the system proposed in FR 2,731,009; U.S. Pat. Nos. 4,991,395; 4,844,028 and Celcat®, if a coating appears in the combustion chamber, said coating is uncontrollable, is not uniformly distributed, whereby the efficiency varies greatly and is unpredictable. Moreover, in said system, the possible coating of the combustion chamber is a slow process, coating which is not accurate as being done in presence of a large volume of combustion gases and under variable and not controllable conditions, such as load, pressure, temperature, fuel, etc. When cerium is present in a large volume of combustion gases, the possible coating with cerium of wall of the combustion chamber is made in presence of carbon particles, whereby being removed with said carbon particles. Such a coating, when occurring, is not suitable for ensuring a stable and controllable $NO_x$ reduction.

The invention relates to a process and a device suitable for solving one or more problems cited hereabove.

The invention relates thus to a process and device having one or more of the following advantages:
- immediate or substantially immediate $NO_x$ reduction due to the presence of a primary catalyst layer or coating
- more stable $NO_x$ reduction rate due to the regeneration step when required
- possibility to control the quality of the primary catalyst layer or coating
- low Ce/Eu/Yb/Pr particles emission as less cerium/europium/ytterbium/praseodymium is required for the regeneration
- possibility to have a primary coating of specific part of the combustion chamber, inlet, outlet, EGR, etc.
- possibility to make intermittent regeneration (for example no regeneration in city or in a tunnel), while ensuring a substantially constant $NO_x$ reduction rate
- possibility to make the primary coating under specific conditions
- easier regeneration
- possibility to reduce as low as possible the emission of cerium in the atmosphere
- better efficiency of the catalyst (less dioxin and/or less polycyclic aromatic hydrocarbon and/or less $NO_x$ and/or less soot and/or less HC and/or less $S/SO_2/SO_3$
- surface catalytic effect with volumetric catalytic effect, especially when the surface catalytic effect has to be regenerated
- possibly to use multi ignition system
- no soot deposit in the combustion chamber
- possibility to ensure or to control a multi spot or local deflagration or combustion
- better admission of air in the combustion chamber, less pumping resistance,
- whereby enabling a downsizing of the combustion chamber for a given power
- better removal of the exhaust gases
- admission of cerium and/or europium and/or ytterbium and/or praseodymium in the volume of the combustion chamber only when required, whereby reducing the consumption of cerium, moreover, the amount of cerium and/or europium and/or ytterbium and/or praseodymium added in the volume of the combustion chamber is an amount only required for regeneration of the activity of the surface catalyst
- longer time efficiency of the exhaust catalyst, for example of a three ways catalyst
- lower exhaust temperature
- less vibrations of the motor (in the three orthogonal directions), whereby the motor is submitted to less stresses (for example reduction of more than 15%, such as reduction of more than 30% or even of more than 40%
- excellent working of the motor, even if the used fuel is substantially free of antiknock agent and/or detergent
- enabling an autoregulating effect, for example in function of the oxygen content of the intake air
- enabling to increase the possible compression ratio for petrol, while enabling to lower the compression ratio requested for the diesel combustion
- enabling to have a lean burn combustion, while ensuring that the combustion gases are still within the working range of the converter or three-ways catalytic converter type
- reducing the necessity to use $DeNO_x$ or other gas treatment with urea or $NO_x$ absorber
- possibility to have efficient working with lower combustion peak pressure and lower combustion peak temperature, while inducing longer combustion time
- improving the further burning reaction (second pressure wave) of the still present fuel after the classical burning end (first pressure wave)
- enabling to have combustion conditions corresponding to a lean combustion, even if at the admission conditions correspond substantially to stoichiometric conditions, the conditions at the exhaust correspond to the conditions for a stoichiometric combustion
- higher maximum combustion pressure
- keeping a high pressure during a longer combustion period, preferably at lower temperature
- when the primary coating is sufficiently efficient, an admission of water or water vapor in the combustion chamber is advantageous
- when gas recirculation is carried out, no clogging of the recycling pipe was observed due to carbon deposit
- lower need of fuel
- less green house gases
- lower energy initiation and/or ignition,
- better reaction control, enabling oxidation of fuel and reduction of pollutants, such as noxious gases, i.e. ensuring the best oxidation of the fuel, while ensuring a good reduction of pollutants, such as noxious gases and particles
- a high availability of free electrons or ions or cations or anions, whereby ensuring a more rapid reaction and a more controlled reaction, such as a more complete reaction
- control of the combustion, so that the initial combustion condition corresponds substantially to the auto inflammation
- the primary coating has advantageously properties counteracting the deposit of carbonaceous particles, whereby avoiding the problem of clogging and whereby enabling said carbonaceous particles to be burned at least partly,
- formation of volumetric nanoparticles (La, Ce, Eu, Yb, Pr) in the combustion chamber,
- controlling the minimal inflammability temperature of the fuel or of the diesel
- better use of the energy of the fuel (for example its high energy value or heating value)
- less potential required for the ignition, low electrical load on the electrical system, whereby more power available for the work efficiency
- emission of soluble gaseous compounds, especially of water soluble compounds, such as nitrate, carbonate, sulfate, etc. which can easily be collected or recovered for example when damping water or a water excess, for example in the form of salts of La, Ce, Eu, Yb, Pr, etc,
- reduction of the weight of the motor, while maintaining a same output or torque
- increasing the torque efficiency per unit of combustion volume or maximal combustion volume or nominal combustion volume
- enabling better or higher lean air fuel mixture at the admission, with no or substantially no knocking and without excess of unburned HC
- possibility to avoid flame quenching, whereby avoiding the formation of unburned hydrocarbon, and whereby enabling the % of EGR, for example above 30%, such as above 50% or even more,
- higher production of degenerative branching agent, whereby reducing pollutant (noxious product, solid carbon particles, etc.) to harmful precursors or harmful product, whereby better use of the energy content of the fuel possibility to reduce the length of the intake manifold and/or of the exhaust manifold less red hot carbon particles due to the presence of higher oxygen content at the end of the combustion easier cooling of the engine (refrigerant circuit, cooling of the piston by oil projection, etc.) or reduced cooling system etc.

BRIEF DESCRIPTION OF THE INVENTION

The invention relates to a process of combustion of a material, preferably a gaseous or liquid combustible, in a combustion chamber associated with an admission means conducting and admitting an oxygen containing gas in the combustion chamber and an exhaust means exhausting flue gases out of the chamber and conducting flue gases towards an outlet, in which:

at least a part or portion of the chamber and/or the admission means in contact with flue gases and/or the exhaust means is provided with a primary $NO_x$ reducing catalyst, said catalyst being deposited in less than 24 hours (advantageously in less than 12 hours, preferably in less than 8 hours, most preferably in less than 4 hours, such as in less than 2 hours, less than 1 hour, most preferably in less than 30 minutes, such as in less than 15 minutes) when the deposit is made in presence of flue combustion gases with a temperature higher than 400° C., especially with a temperature higher than 200° C., said catalyst being present in an effective amount for ensuring a first average reduced $NO_x$ content in the flue gases, said average being measured for a combustion time of one hour, (said first average reduced $NO_x$ content corresponds for example to the initial average $NO_x$ content or to average $NO_x$ content with a fresh catalyst or to the average $NO_x$ content after a combustion period of 6 hours with a fresh catalyst) and said primary $NO_x$ reducing catalyst is treated continuously or intermittently with a cerium and/or europium and/or ytterbium and/or praseodymium containing composition and/or compound (said compound is however preferably substantially manganese free for avoiding possible ozone problems or other environmental problems in countries where manganese is prohibited for said problems) in presence of a gaseous medium comprising at least water vapor and/or exhaust combustion gases at a temperature higher than 200° C. (advantageously higher than 400° C., preferably at temperature from 500 up to 1200° C.), in an effective amount for maintaining the average reduced $NO_x$ content in a range lower than 5 times the first average reduced $NO_x$ content, advantageously for maintaining the average reduced $NO_x$ content within a range from at least 0.3, preferably at least 0.5 times the first average reduced $NO_x$ content, preferably within the range 0.3 to 3, advantageously 0.5 to 2 times the first average reduced $NO_x$ content.

For the treatment step, it is possible to use various systems for adding cerium and/or europium and/or ytterbium and/or praseodymium or cerium and/or europium and/or ytterbium and/or praseodymium containing compound(s) in the inlet means (such as intake manifold, preferably after the throttle ), in the combustion chamber, in the exhaust gas recirculation system (EGR) and/or in the exhaust means. When cerium and/or europium and/or ytterbium and/or praseodymium containing compound is added in the combustion chamber, the system of FR 2,731,009; U.S. Pat. Nos. 4,991,395; 4,844,028 and Celcat can be used. However, a more specific device will be disclosed later. More specifically, cerium and/or europium and/or ytterbium and/or praseodymium (for example as compound containing this rare earth) is directly injected in the combustion chamber with water or water vapor or alcohol or glycol.

The regeneration treatment is advantageously operated at an average top combustion temperature lower than 900° C., preferably lower than 850° C., such as lower than 800° C., for example lower than 700° C. Said average temperature is for example determined on the combustion expansion cycle of the motor.

The treatment step is advantageously at least a partial regeneration step of the primary catalyst and/or a partial post coating of the primary catalyst.

Advantageously, said primary $NO_x$ reducing catalyst is treated (preferably at least partly regenerated ) with an effective amount of cerium and/or europium and/or ytterbium and/or praseodymium composition or compound, said effective amount being selected so as to avoid substantially any cerium and/or europium and/or ytterbium and/or praseodymium nanoparticles emission at the outlet. For examples, the content of cerium and/or europium and/or ytterbium and/or praseodymium nano particles in the flue gases is lower than 50 ppm, for example lower than 20 ppm, advantageously lower than 10 ppm, preferably lower than 5 ppm, such as comprised between 1 ppb and 2 ppm, for example 5 ppb, 10 ppb, 50 ppb, 100 ppb, 200 ppb, 500 ppb.

When the treatment step is made intermittently, it has been observed that it was advantageous to add or admit water or water vapor or an aqueous medium (free or substantially free of cerium and/or europium and/or ytterbium and/or praseodymium, but possibly mixed with one or more additives, such as glycols, alcohols, aldehyde, peroxide, etc., so as to form for example an alcohol containing medium, a glycol containing medium, etc.) in the combustion chamber (directly or indirectly for example via the inlet means or intake manifold) during a combustion period for which the primary coating is not treated with a cerium and/or europium and/or ytterbium and/or praseodymium containing composition or compound in presence of water vapor and/or exhaust combustion gases at a temperature higher than 200° C.

According to a specific embodiment of the method, water or water vapor or aqueous medium or an alcohol medium or a glycol medium free of cerium and/or europium and/or ytterbium and/or praseodymium is admitted in the combustion chamber or in the inlet means or intake manifold during a treatment step of the primary coating, such a water or water vapor or aqueous medium or alcohol medium or glycol medium admission enabling a better control of the water content present in the combustion chamber and/or enabling a supplemental control of the combustion in function of the amount of water added or present during the combustion.

The primary $NO_x$ reducing catalyst is advantageously a refractory catalyst, for example a refractory base material or support provided with one or more $NO_x$ reducing catalyst compounds or element.

According to a preferred embodiment, the primary $NO_x$ reducing catalyst forms a coating of at least a portion of inner wall(s) of the combustion chamber, preferably in the form of a series of adjacent spots, said spots being advantageously distributed quite uniformly on the inner wall(s) of the combustion chamber, said spots not covering completely the inner wall(s), but preferably a large number of spots contacting each other so that a series of spots connected the one to the other extend around one or more zone(s) not coated. According to an embodiment, the zones not provided with a cerium/europium/ytterbium and/or praseodymium coating are provided with carbon or are zone suitable for carbon deposit.

According to an embodiment, in which the combustion gases are filtered or washed or trapped or treated in a filter or washing means or a reactor or in an absorption means or absorber (for enabling for example a selective absorption) before being exhausted via the outlet, at least a part or a portion of the means conducting the flue gases from the combustion chamber to the filter and/or washing means and/or reactor and/or absorption means is provided with a primary $NO_x$ reducing catalyst coating. Said coating coats preferably the inner wall(s) of the conducting means in the form of a series of spots, whereby leaving zones of the wall(s) uncoated or free of coating.

According to another embodiment, in which a portion of combustion flue gases is recycled in the combustion chambre via a recycling conducting means, at least a part or a portion of the recycling means conducting flue gases towards the combustion chamber is provided with a primary $NO_x$ reducing catalyst coating. Said coating coats preferably substantially all the inner wall(s) of the conducting recycling means. The recycling means comprises for example the exhaust manifold, an exhaust pipe and a pipe linking the exhaust pipe with an inlet pipe or with the intake manifold. The recycling means can also be a simple pipe connecting the exhaust manifold with the inlet or with the intake manifold or with the combustion chamber. For example, for a combustion chamber comprising at least an inlet valve and an exhaust valve, the recycling means can be a pipe linking a zone outside the combustion chamber adjacent to the exhaust valve with a zone outside the combustion chamber adjacent the inlet valve.

Preferably, the combustion gases are filtered and/or washed and/or reacted and/or treated, whereby filtered and/or washed and/or reacted and/or treated combustion gases are recycled towards the combustion chamber.

According to a possible embodiment, the primary $NO_x$ reducing catalyst comprises at least one element selected from the group consisting of Ce, Pt, Pd, Cu, Sc, Y, Si, Eu, W, Va, Ga, Si, Al, Ni, Ru, Mo, Ni, Al, La, Co, Rh, Ti, Ca, Yb, Pr, lanthanides and mixture thereof. Said primary reducing catalyst can comprises one or more of said elements as metal, oxide, dioxide, sulfide, sulfate, hydroxide, carbonate, phosphate, oxalate, chloride, fluoride, nitrate, carbide, iodide, ammonium, bromide, bromate and mixtures thereof. The salts are in their anhydride form or in one or more of their hydrate forms. Said elements are advantageously in the form of one of their oxides, said oxide(s) being in a crystalline form, semi crystalline form, amorphous, semi-amorphous or combination thereof, but advantageously at least partly in their amorphous or semi amorphous state.

Preferably, the primary $NO_x$ reducing catalyst coating is deposited under controlled conditions.

For example, the primary $NO_x$ reducing catalyst coating is after being deposited submitted to at least one step selected among the group consisting of heating at a temperature higher than 200° C., advantageously higher than 300° C., preferably higher than 500° C., a washing step, a gas blowing step, a control step of the efficiency of the deposit or of properties or characteristics of the deposit. The primary reducing catalyst coating is advantageously uniformly or substantially uniformly dispersed on at least a portion of a wall of the combustion chamber. The primary $NO_x$ reducing catalyst can be deposited in presence of a hot gas or is treated after being deposited with a hot gas, said hot gas being for example hot flue gases, nitrogen, argon, air, air enriched in oxygen, $CO_2$, high pressure water vapor, etc. The coating deposit or the after treatment thereof is advantageously made under controlled condition, such as at least partly under a pressure higher than 1.1 bar, such as more than 5 bars, advantageously more than 10 bars, preferably more than 20 bars, such as more than 40 and even 50 bars and/or at least partly under a pressure lower than 0.8 bar, advantageously lower than 0.6 bar, such as lower than 0.5 bar. According to a specific treatment step, the treatment of the deposit is made partly under a pressure greater than 5 bars and partly under a pressure lower than 0.8 bar, for example according to a controlled pressure cycle. The treatment step of the deposit can be operated during a period of at least 5 seconds, such as at least 10 seconds, for example within a period of 30 seconds and one hour. The treatment can be longer, but a longer treatment step often does not add further advantage with respect to the $NO_x$ reduction.

For example, the primary $NO_x$ reducing catalyst composition is first applied on the surface to be coated or provided with a catalyst layer. Said composition is for example a composition comprising catalyst element in their metallic form or as a salt thereof or as a hydroxide thereof, whereby after the heating step, said catalyst element is at least partly in one of their oxide forms.

According to a detail of an advantageous embodiment, means determines or estimates at least roughly the $NO_x$ content of the combustion gases at different times and controls the treatment or regeneration of the primary $NO_x$ reducing catalyst when the determined or estimated $NO_x$ content is above a threshold or a predetermined value and/or controls the water and/or water vapor and/or aqueous medium admission in the combustion camber or the inlet thereof in function of the determined or estimated $NO_x$ content. For example, the control of the combustion is first operated by admitting water or water vapor or aqueous medium (free of cerium and/or europium) in the combustion chamber or the inlet thereof so as to maintain the $NO_x$ content in the flue gases to less than a maximum value, and when the $NO_x$ content cannot be maintained under said maximum value or an maximum admitted value, cerium and/or europium with water or water vapor or aqueous medium or an alcohol medium or a glycol medium is admitted in the combustion chamber or inlet thereof for regenerating the primary catalyst and controlling the combustion. As soon as the $NO_x$ content is reduced to less than a minimum value, the regeneration of the catalyst is stopped and the combustion is further controlled by admitting water/water vapor/alcohol/glycol in the combustion chamber or inlet thereof.

Possibly the control of the regeneration step of the catalyst can be operated in function of a mobile average $NO_x$ content, for example a mobile average determined on a period of less than 30 minutes, such as on a period of 15 minutes or of less than 15 minutes, such as on 10 minutes, on 5 minutes or even on a period between 1 and 3 minutes.

Preferably, the primary $NO_x$ reducing catalyst coating has substantially uniform characteristics, for example forming a substantially uniform heterogenous dispersion on at least one surface selected from the group consisting of surface of the combustion chamber, valves, cylinders, cylinder heads, piston heads, spark plugs, manifolds (intake and/or exhaust, but preferably on at least substantially all the surfaces of the combustion chamber and/or at least portion of the piping, preferably substantially all the surface of the exhaust piping and/or of the exhaust gas recirculation.

Advantageously, the treatment or regeneration or rejuvenation of the primary catalyst coating is carried out by contacting said coating with a gaseous medium containing at least cerium and/or europium and/or ytterbium and/or praseodymium or a cerium and/or europium and/or ytterbium and/or praseodymium containing compounds or cerium and/or europium and/or ytterbium and/or praseodymium containing particles, said contact being carried out at a temperature higher than 200° C., advantageously higher than 300° C., preferably higher than 400° C. Preferably, a cerium and/or europium and/or ytterbium and/or praseodymium containing compound is contacted with a gaseous medium containing water vapor so as to form a gaseous medium containing cerium and/or europium and/or ytterbium and/or praseodymium or cerium and/or europium and/or ytterbium and/or praseodymium containing compound or cerium and/or europium and/or ytterbium and/or praseodymium containing particles, said gaseous medium being then conducted in the combustion chamber.

For example, a cerium and/or europium and/or ytterbium and/or praseodymium containing compound is contacted with a gaseous medium containing water vapor having a temperature comprised between 20° C. and 90° C., advantageously between 40° C. and 75° C., preferably between 50° C. and 65° C., so as to form a gaseous medium containing cerium and/or europium or cerium and/or europium containing compound or cerium and/or europium containing particles, said gaseous medium being then conducted in the combustion chamber.

According to another possible embodiment, cerium and/or europium and/or ytterbium and/or praseodymium and/or a cerium containing compound and/or an europium containing compound and/or ytterbium and/or praseodymium containing compound or a mixture thereof is contacted with a liquid or with an aqueous medium or with an alcohol medium or with a glycol medium, so as to form a alcohol/glycol/aqueous medium containing cerium and/or europium, such as an aqueous medium containing cerium and/or europium and/or ytterbium and/or praseodymium. The alcohol/glycol/aqueous medium (advantageously injected in the combustion chamber) may contain one or more additives, such as peroxide, calcium hydroxide, magnesium hydroxide, etc.), as well as alcohol, glycols, aldehyde. The water or aqueous medium or alcohol medium or glycol medium contacting the cerium and/or europium and/or ytterbium and/or praseodymium containing compound has for example a controlled temperature comprised for example between 15° C. and 75° C., such as 20° C., 25° C., 30° C., 35° C., etc. The medium, preferably aqueous medium, containing cerium and/or europium and/or ytterbium and/or praseodymium (which has a quite controlled and stable cerium/europium content) is then injected, such as sprayed or nebulized or vaporized, in the combustion chamber or in the intake manifold (preferably after the throttle) or in the exhaust manifold (for example adjacent to the exhaust valve, whereby said medium is sucked during the inlet step before the closing of the exhaust valve) or in the piping used for the exhaust gas recirculation or recycling). When injecting water or hot water or alcohol or glycol in the combustion chamber, said hot water, alcohol, glycol is quickly vaporized in the combustion chamber due to the temperature of the wall of the combustion chamber and/or due to the presence of hot combustion gases or remaining combustion gases.

According to an embodiment, the treatment or regeneration is controlled in function of at least one of the parameters selected from the group consisting of charge or load of the combustion motor, combustible flow, air flow, speed of the combustion motor, air/combustible mixture, noxious gases, Oxygen content in the flue gases, $CO_2$ level in the flue gases, temperature of the motor (for example the admission of volumetric cerium/europium in the combustion chamber is always made during the starting of the motor, i.e. as long as the temperature of the motor has not reached a quite stable temperature, for example an average temperature comprised between 80 and 120° C. or as long as the temperature of the refrigerant liquid is below at least 75° C., such as below about 85° C.), in function of the variation of speed or acceleration (for example when the rate of acceleration is high), etc.

The process of the invention can be operated in a closed chamber (with intermittent opening of door(s) or valve(s)) or in an open chamber, such as boiler, reformer, fuel cells, kiln, incinerator, ovens, steel works, power station, explosion chamber, turbines, burner, central heating system, grass cutting machine, HCCI (heterogeneous charge compression ignition), CAI or homogeneous combustion engine, rocket, guns, flat engines, space shuttle, air planes, furnaces, propellant, pulsation combustion, auto inflammation engine, etc.

Examples of motors or combustion chamber in which the process of the invention can be operated are:

linear motors, multistrokes motors (2,4,6,8,10,12, etc. strokes), jet, turbine, turbojet, fan jet, statoreactor, rotative explosion motor (such as motors of the Wankel family), steam combustion motors, reciprocating motors, rocket type, motor with variable compression ratio, motor with variable lift and valve opening (in time and/or in position), turbocompressor, supercharger, etc., with or without pre and/or post combustion. The combustion can be homogeneous, heterogeneous, stratified, and/or any combinations thereof. The motor can be cooled by air, water, oil, over fuel, refrigerant, synthetic refrigerant, etc.

Examples of possible fuels which can be used in the process of the invention are:

Gas, methane, butane, propane, liquid, solid fuel, powder fuel, coke, biofuel, natural fuel, synthetic fuel, hydrazine, rocket fuels, hydrocarbons, petrochemical fuels, solid fuel, liquid fuel, gaseous fuel, rubber (synthetic/natural), dust fuel, sugar, alcohol, ethanol, crude oil, diesel, petrol, alcohol, waste, natural gas, hydrogen, algae, peat, coal (pulverized or not), etc., and mixtures thereof, with or without water addition and with or without additives, such as scavengers (for example organometallic compound).

The fuel can be admitted in the combustion chamber through injectors or nozzles for direct admission of the fuel into the combustion chamber or for indirect admission (for example for injecting the fuel in the combustion air before its introduction in the combustion chamber). The injection can be made intermittently and/or continuously, for example one injection for one combustion step or stroke, pilot injections, several intermittent injections for one combustion step or stroke, such as a pre injection, a principal injection and possibly a post injection, such as also a multiple injection (a series of 4, 5, 6 or more intermittent injections with variable amount of injected fuel). The injection can be operated with a dosage pump, with hydraulic means, with electromagnetic means, with piezoelectric means, with hydraulic-pneumatic means (such as the device disclosed in U.S. Pat. No. 5,494,015, the content of which is incorporated in the present specification by reference), etc.

The ignition of the combustion can be operated by one or more sparks, by compression, by light emission, by gas (flue gas) recirculation (HCCI, CAI, etc.), by auto inflammation, or substantially by auto inflammation, said ignition being for example operated in a homogeneous and/or heterogeneous and/or stratified charge or premix charge. The ignition can be an ignition in volume and/or on surface, with or without pre combustion chamber. In such a case the precombustion is advantageously provided with a $NO_x$ reducing catalyst. According to an embodiment, the initial ignition is made on surface, whereby the condition are suitable thereafter for a volume ignition, such as a homogeneous volume ignition, and/or for ensuring a volume auto inflammation.

The combustion can be operated with atmospheric air, compressed air, oxygen enriched air, oxygen, mixtures of water vapor and oxygen and/or air, peroxides, etc. The comburant can enter the combustion chamber by natural aspiration, force draft (compressor, fan, turbine, supercharger such as a device disclosed in U.S. Pat. No. 6,328, 004, the content of which is incorporated in the present specification by reference, etc.).

The control of the combustion, especially of motor engine, can be operated by mechanical and/or electronic and/or pneumatic and/or magnetic means.

The combustion process can be provided with a gas recycling, such as an exhaust gas recycling starting from the exhaust valve and/or from the exhaust manifold and/or from the external outlet, and/or between the exhaust manifold and the external outlet, for example an internal exhaust gas recycling (external exhaust gases or exhaust gases escaping the chamber through an inlet valve and/or outlet valve are at least partly flowing back in the combustion chamber), an external exhaust gas recycling with or without intercooler and/or with or without a (multi) gases cleaning system (catalytic cleaning system, 3-way catalyst, De NOX system, trapping, absorbing system, particles filters, etc.) and/or with or without water removal or water collecting system.

When the combustion chamber is provided with one or more valves, said valve(s) can be operated hydro pneumatically, electromagnetically, mechanically, combinations thereof, etc. with or without variable lift and/or time opening and/or duration.

The combustion can be a stoichiometric combustion or a lean burn combustion or a rich combustion or a mixture of lean burn and stoechiometric combustion or any combinations thereof. The air admission in the combustion chamber can be adapted for a stoechiometric environment, while when the combustion occurs, the combustion corresponds substantially to a lean burn combustion due to formation of oxygen or oxygen species. Preferably, when the air admission or intake is controlled for condition corresponding to a lean burn combustion, the combustion or at least the major part thereof (for example from about the begin up to about the end, such as combustion rate corresponding for example to more than 90%, such as more than 95%) occurs in leaner condition, most preferably as a extreme lean condition, such as the most extreme possible lean condition. In the present specification, a combustion is considered as a lean burn combustion when the combustion is a combustion of fuel in presence of an excess of oxygen or oxygen type or oxygen species. The most lean burn condition of the invention corresponds to the limit of flammability of the mixture fuel/comburant in presence of an excess of oxygen or oxygen type with respect to a stoichiometric. Said most lean burn limit depends from the motor configuration and its working. For example, the most lean burn limit (for example expressed as the lambda factor) for an engine of the invention is increased by at least 15%, advantageously at least 20%, preferably at least 25%, such as 30%, 40%, 50% or even more, with respect to the lean burn limit of the same engine but without catalyst coating and regeneration system. The exhaust gases of the combustion correspond however to conditions corresponding to exhaust gases for a stoechiometric post combustion. In case, the exhaust gases escaping from an engine of the invention are treated in a post combustion system, said post combustion system has a larger range of efficient working with respect to the true stoichiometry, for example with the range 0.5× the stoichiometry up to 2× the stoichiometry, for example between 0.8× the stoichiometry and 1.2× the stoichiometry. When a post combustion is carried out, said post combustion can be homogeneous, heterogeneous, stratified, combinations thereof, with or without continuous flow, such as with a surface reactor, such as a substantially cylinder or multi cylinder reactor with wall coated with one or more catalysts, such as catalyst comprising europium/cerium/praseodymium/ytterbium. The efficiency of the post combustion catalyst is even regenerated by the presence in the flue gases of traces of cerium/europium/ytterbium/praseodymium.

The combustion chamber can comprise, when burning solid materials or solid powders, a fixed bed and/or a fluidized bed and/or a pulsed bed.

When the process is used for a car engine, the combustion chamber can be provided with means for controlling the compression ratio. The chamber can thus be a chamber with a variable volume.

When using a spark plug for the ignition, the spark plug can be a spark plug with one or more anodes (linear, circular, etc) and with one or more cathodes (linear, circular, etc.), but can also advantageously be a spark plug with only one or more electrodes of the same sign (positive or negative), the piston (such as piston head) and/or at least portion of walls of the combustion chamber forming then the counter electrode or the ground electrode. The electrode(s) can be coated with one or more coatings, such as coatings comprising one or more atoms selected from the group consisting of Ce, Eu, Yb, Pr, Pt, Pd, Co, Cu, Au, Ag, La, etc. and mixtures thereof.

According to a detail of an advantageous process of the invention, the combustion is operated in presence of water vapor and/or alcohol (ethanol, methanol, mixture thereof) and/or glycol (ethyleneglycol, propylene glycol)and/or an aldehyde. Said water vapor (for example with a temperature comprised between 40° C. and 250° C., advantageously between 45° C. and 75° C.) possibly mixed with air is for example mixed with the intake air, injected in the intake manifold, but preferably injected directly in the combustion chamber. The alcohol and/or aldehyde and/or glycol when used are preferably injected directly in the combustion chamber, possibly mixed with the fuel to be injected. Possibly, said water, alcohol, glycol or aldehyde can be sprayed directly in the combustion chamber or in the intake (for example at the end of the intake, adjacent to the combustion chamber) as hot liquid, for example with a temperature greater than 35° C., such as temperature comprised between 40 and 95° C.

According to a preferred embodiment of the process of the invention, the combustion is at least partly operated in presence of nano particles of hydrated aluminum silicate, such as clay, especially bentonite, preferably wolframite, . . . , such as colloidal suspension of these compounds.

Advantageously, at least the treatment or regeneration or rejuvenation step with cerium/europium or cerium and/or europium containing compound is operated in presence of nanoparticles of hydrated aluminum silicate compounds, such as clay, especially bentonite and wolframite. When operating the treatment or regeneration with cerium or cerium containing compound(s) and/or with europium or europium containing compound, the weight ratio hydrated aluminum silicate/cerium or cerium content of the cerium containing compound and/or europium or europium content of the europium containing compound and/or ytterbium and/or praseodymium or ytterbium and/or praseodymium content of the ytterbium and/or praseodymium containing compound is comprised between 0.1 and 100, advantageously between 0.5 and 20, preferably between 0.7 and 10. The hydrated aluminum silicate is advantageously in the form of colloidal particles, such as colloidal bentonite or wolframite particles. Possibly, the bentonite clay can be replaced partly or totally with substance suitable to make refractory compounds, such as silica, magnesia, silica-magnesia, silica-alumina, montmorillonite clays. The size of the nano particles is preferably lower than 20 µm, most preferably lower than 15 µm, especially lower than 10 µm, or even lower such as 5 µm, 3 µm, 2 µm, or even lesser.

The use of hydrated aluminum silicate compounds during the treatment or regeneration seems to be suitable for still improving the reduction of the amount of dioxin, PAN, PAH, Hg containing compounds, sulfur compounds, fluoride, borate, bromide, etc. in the flue gases, as well as precursors thereof. Dioxin if formed is then absorbed by the aluminum silicate, advantageously acidic activated. Furthermore, the presence of said aluminum silicate is suitable for forming refractory support or layer provided with atom(s) of the ceric and/or yttric family, such as Ce, Pr, Nd, Pm, Sm, Eu, Gd, La, Ac, Sc, Y, Yb, Pr, Rh, Co (cerium and La being preferred), said support or layer having good heat resistance.

Possible refractory material which can be used with cerium and/or europium and/or ytterbium and/or praseodymium are compounds comprising one or more elements selected from the group consisting of Al, Si, Ca, Ti, Ni, Ga, Mo, W, Ru, Pd, La, Yt, Yb, Pr, Sc, Rh and other lanthanide, said compounds being a carbonate, nitrate, ammonium, sulfate, iodide, bromate, bromide chloride, carbide, fluoride, nitrate, oxide, sulfide, sulfate, oxalate, hydroxide, sulfate and mixtures thereof, in their anhydride form or in one or more of their hydrate forms.

Specific examples of suitable refractory material are alumino silicates, hydrated alumino silicate, bentonite, wolframite, zeolithe, acid zeolithes, magnesite, bauxite, aluminium oxide, silica alumina, silica magnesia, kieselguhr, acid treated clays, montmorillonite clays, magnesium oxide, crushed firebricks, silica, glauconite, and mixtures thereof. Bentonite is preferred, while wolframite is most preferred. The refractory material can be in a hydrated form.

The cerium and/or europium and/or ytterbium and/or praseodymium used in the process of the invention can be metal cerium, metal europium, a cerium salt, possibly a hydrated form of such a salt, an europium salt, possibly a hydrated form of such a salt, an ytterbium and/or praseodymium salt, possibly a hydrated form of such a salt. As possible cerium salts, the following can be mentioned: carbonate, nitrate, ammonium, sulfate, iodide, bromate, bromide chloride, carbide, fluoride, nitrate, oxide, sulfide, sulfate, hydroxide, sulfate and mixtures thereof, in their anhydride form or in one or more of their hydrate forms. The cerium and/or europium and/or ytterbium and/or praseodymium is preferably not in a form corresponding to an organometallic compound with at least a carbon chain or group of 3 or more than 3 carbon atoms not substituted by at least a hydroxyl group, most preferably not in a form corresponding to an organometallic compound with a hydrocarbon chain or group with two or more than two carbon atoms. More specifically, the cerium and/or europium and/or ytterbium and/or praseodymium compound is not in a form corresponding to an organometallic compound comprising a hydrocarbon group. The cerium and/or europium and/or ytterbium and/or praseodymium used in the process is preferably not mixed with liquid fuel comprising more than 90% by weight of hydrocarbon compounds with more than 4 carbon atoms, such as hexane, octane, etc.

The cerium compound can possibly be mixed with other rare earth compounds or lanthanides and/or can possibly contain one or more other rare earth compounds. Possible other rare earth compounds are Sc, Y, Yb, Pr, La, Nd, Pm, Sm Eu, Gd, etc. and mixtures thereof. Said other rare earth metal can be as metal or in the form of a salt such as carbonate, nitrate, ammonium, sulfate, iodide, bromate, bromide chloride, carbide, fluoride, nitrate, oxide, sulfide, sulfate, hydroxide, sulfate and mixtures thereof, in their anhydride form or in one or more of their hydrate forms. Most preferably the cerium compound contains at least trace of europium. For example, cerium is prepared from monazite.

The cerium and other rare earth compounds can contain one or more elements selected from the group consisting of Na, Mg, Ca, Zr, Hf, Nb, Y, Ni, Cu, Pt, Pd, Ga, Co, Rh, Mg, Ti, Ta, Th, Mn, Fe, Co, Rh, Al, Tl, Yb, Pr, Si and mixtures thereof, as metal and/or as a salt, such as carbonate, nitrate, ammonium, sulfate, iodide, bromate, bromide chloride, oxalate, carbide, fluoride, nitrate, oxide, sulfide, sulfate, hydroxide, sulfate and mixtures thereof, in their anhydride form or in one or more of their hydrate forms.

When introducing cerium and/or europium and/or ytterbium and/or praseodymium compound with one or more refractory compounds and/or precursors thereof into the combustion chamber, it has been observed that a protection effect was obtained for the primary reducing catalyst, whereby ensuring a better working thereof and a longer life time. Furthermore, it has also been observed that when introducing cerium and/or europium and/or ytterbium and/or praseodymium compound with one or more refractory compounds and/or precursors thereof into the combustion chamber, some catalytic $NO_x$ reduction was obtained in the volume of the combustion chamber, as well as in the outlet pipe and/or converter.

As it has been observed that the water content of the flue gases was quite high (such as more than 15% when burning liquid, for example from 20 to 40%), in an embodiment it is proposed to remove some water from the exhaust gases, before and/or after (preferably at least partly before) said gases are treated in the cleaning system. Said water removal is made by condensation, such a condensation being advantageous for recovering or trapping solid particles or for forming larger particles, which are easy to trap. The so condensed water can then be reused for being injected in the combustion chamber or in the intake.

Such a condensation reduces the volume of exhaust gases, such a reduction of volume creating a suction or depression in the combustion chamber. By selecting the place where the condensation occurs, it is possible to control the moment of the depression created in the combustion chamber. However, when using specific catalyst for the treatment of flue gases before their external exhaust, said catalyst having a better efficiency in presence of water or water vapor, it can be of interest to limit or avoid any water condensation before said catalytic treatment.

Another aspect of the invention is therefore the combined use of a cerium and/or europium and/or ytterbium and/or praseodymium containing compound with one or more refractory compounds and/or precursors thereof in a combustion chamber so as to reduce the emission of noxious gases. The weight ratio cerium and/or europium and/or ytterbium and/or praseodymium containing compound/refractory compound is advantageously lower than 75, preferably lower than 50, most preferably lower than 25, especially lower to about 10. For example said weight ration is comprised between 2 and 20, advantageously between 1 and 10, preferably between 0.5 and 8, for example between 3 and 5. The invention relates thus also to a process of combustion of a material, preferably a gaseous or liquid combustible, in a combustion chamber associated with an admission means conducting and admitting an oxygen containing gas in the combustion chamber and an exhaust means exhausting flue gases out of the chamber, in which the combustion is carried out in presence of an effective amount of cerium and/or europium and/or ytterbium and/or praseodymium containing compound, together with an effective amount of refractory material or a precursor thereof with a particle size lower than 100 μm (advantageously lower than 20 μm, preferably lower than 5 μm or even better nanoparticles, such as particles with a size of less than 500 nm), for reducing the $NO_x$ content of the flue gases. Preferably, at least a part of refractory material or precursor thereof (advantageously substantially the whole effective amount of refractory material) is dispersed in at least a part of the volume of the chamber during the combustion. Most preferably, at least a part of the cerium and/or europium containing compound and at least a part of the refractory material or precursor thereof (advantageously substantially the whole effective amount of cerium and/or europium containing compound and the whole effective amount of refractory material or precursor thereof) are dispersed in the volume of the chamber. The dispersion is preferably substantially homogeneous in the combustion chamber or at least in the portion of the chamber where the flame occurs and/or just above the flame. The refractory material or precursor thereof are preferably admitted in the combustion chamber in a hydrated and/or wetted form.

For admitting the effective amount of cerium and/or europium and/or ytterbium and/or praseodymium containing compound and the effective amount of refractory material or precursor thereof, it is possible to use various systems such as the systems disclosed in FR 2,731,009; U.S. Pat. Nos. 4,991,395; 4,844,028 and Celcat® system, but preferably adapted for admission of compound(s) after the throttle (the invention relates thus also the use of one system disclosed in FR2,731,009 and/or in U.S. Pat. Nos. 4,991,395 and/or 4,844,028 and/or Celcat® system for the admission of compounds in the inlet system after the throttle), with use of a composition containing cerium and/or europium and/or ytterbium and/or praseodymium containing compound and refractory material or precursor thereof, for example a mixture of microparticles and/or nano particles. The admission can also be operated separately, so as to be able to control the ratio amount of cerium and/or europium admitted in the combustion chamber/amount of refractory material or precursor thereof admitted in the combustion chamber. However, preferably the cerium and/or europium and/or ytterbium and/or praseodymium containing compound and the refractory material and/or precursor thereof are admitted in the combustion chamber as a mixture, preferably as a substantially homogeneous mixture, most preferably as a hydrated and/or wetted mixture, especially as an oxygen containing gas flow (such as an airflow) containing hydrated and/or wetted cerium and/or europium and/or ytterbium and/or praseodymium containing compound and hydrated and/or wetted refractory material and/or precursor thereof.

Possible refractory material which can be used in said process with cerium and/or europium and/or ytterbium and/or praseodymium are compounds comprising one or more elements selected from the group consisting of Al, Si, Ca, Ti, Ni, Ga, Mo, W, Ru, Pd, Mg, Y, Co, Rh, etc., said compounds being for example a carbonate, nitrate, ammonium, sulfate, iodide, bromide, bromate, bromide chloride, oxalate, carbide, fluoride, nitrate, oxide, sulfide, sulfate, hydroxide, sulfate and mixtures thereof, in their anhydride form or in one or more of their hydrate forms. Specific examples of suitable refractory material are alumino silicates, hydrated alumino silicate, bentonite, wolframite, zeolithe, acid zeolithes, magnesite, bauxite, aluminium oxide, silica alumina, silica magnesia, kieselguhr, acid treated clays, montmorillonite clays, magnesium oxide, crushed firebricks, silica, glauconite, ane mixtures thereof. Bentonite is preferred, while wolframite is most preferred. The refractory material can be in a hydrated form.

The cerium and/or europium and/or ytterbium and/or praseodymium used in the process of the invention can be metal cerium, metal europium, a cerium salt, possibly a hydrated form of such a salt, an europium salt, possibly a hydrated form of such a salt, an ytterbium and/or praseodymium salt, possibly a hydrated form of such a salt. As possible cerium and/or europium and/or ytterbium and/or praseodymium salts, the following can be mentioned : carbonate, oxalate, nitrate, ammonium, sulfate, iodide, bromate, bromide, chloride, carbide, fluoride, nitrate, oxide, sulfide, sulfate, hydroxide, sulfate and mixtures thereof, in their anhydride form or in one or more of their hydrate forms.

The cerium and/or europium and/or ytterbium and/or praseodymium compound can possibly be mixed with other rare earth compounds and/or can possibly contain one or more other rare earth compounds. Possible other rare earth compounds are Sc, Y, La, Pr, Nd, Pm, Sm Eu, Gd, etc. and mixtures thereof. Said other rare earth metal can be as metal or in the form of a salt such as oxalate, carbonate, nitrate, ammonium, sulfate, iodide, bromate, bromide, chloride, carbide, fluoride, nitrate, oxide, sulfide, sulfate, hydroxide, sulfate and mixtures thereof, in their anhydride form or in one or more of their hydrate forms. Most preferably the cerium compound contains at least trace of europium and/or ytterbium and/or praseodymium. For example, cerium is prepared from monazite and/or a mixture of monazite with yttric based ores, such as bastnasite, etc.

The cerium and other rare earth compounds can contain one or more elements selected from the group consisting of Na, Mg, Ca, Zr, Hf, Nb, Ta, Th, Mn, Fe, Co, Rh, Al, Tl, Si, La, Pt, Pd, Ni, Co, Ru, Sc, Ga, etc. and mixtures thereof, as metal and/or as a salt, such as carbonate, nitrate, ammonium, sulfate, iodide, oxalate, bromate, bromide chloride, carbide, fluoride, nitrate, oxide, sulfide, sulfate, hydroxide, sulfate and mixtures thereof, in their anhydride form or in one or more of their hydrate forms.

It has also been observed that an excellent working of the combustion was possible when using polluted atmospheric air as oxygen source. It has even been observed that when using an air with a high ozone content and/or a high $NO_x$ content and/or a high S content, as oxygen source for the combustion, the exhaust gases had a reduced ozone content, $NO_x$ content and $SO_2$ content with respect to the contents in the inlet air. When using polluted air as oxygen source, the oxygen content of the flue gases was even greater with respect to a combustion not made according to the invention.

The primary $NO_x$ reducing catalyst is for example deposited in the combustion chamber by plasma spray, by coating, by dipping in a bath, by contacting the surface with a liquid or pasta containing the catalyst or a catalytical charge, by vapor deposition, chemical vapor deposition, flame vapor deposition, painting, plasma jet spray, brushing, etc. with or without a burning step (for example at a temperature comprised between 400° C. and 3000° C., preferably between 650° C. and 2000° C.). When a burning step is operated, for example after a rough deposit containing cerium/europium not chemically bound to the surface, the burning step is advantageously at least partly carried out at high pressure, such as pressure higher than 50 bars. The burning step is operated during a period sufficient for enabling the formation of a good chemical bond between the cerium/europium/ytterbium/praseodymium with the surface.

The primary coating or catalyst is advantageously carried out in specific conditions, for example in a specific environment. Such a primary coating is for example made in specific plants, whereby the quality of the primary coating can be controlled easily.

The primary catalyst or coating is advantageously deposited in the combustion chamber (i.e. on one or more walls thereof, preferably substantially on all the wall of the combustion chamber) after a washing or cleaning step. Such a step is for example a partial or complete decoking step or a step for removing excess carbon or excess coke residue. Such a washing is for example carried by means of an active liquid, such as an acidic liquid composition and/or a peroxide containing composition. Possibly, prior said cleaning step, the combustion chamber is heated, for example with hot air or hot oxygen enriched air or is contacted with pure oxygen.

The washing can also be operated by a solid particles (such as sand, $CO_2$) blasting step. Such a sand blasting step can be advantageous for increasing the adherence of the primary coating.

Advantageously, thereafter, a further washing step is operated so as to remove the residue of the prior washing step.

The chamber is then advantageously dried for example by means of filtered dry air (such as hot filtered dry air).

A layer containing catalytic particles or precursor of catalytic particles is then placed on at least a part or portion of the combustion chamber. The so placed layer is then dried or cooked or burned, preferably burned so as to obtain a heat resistant layer, most preferably a refractive layer. For example a coating of cerium/europium/ytterbium and/or praseodymium (as metal, as salt or as hydroxide)+carbon particles is fixed on the surface to be coated, The thickness of said layer fixed on the surface by adhesive agent is then submitted to a cooking or burning so as to form spots of cerium/europium catalyst. The carbon black used is advantageously particles with a size between 150–400 µm and with a BET surface area from 50 $m^2/g$, such as surface greater than 100 $m^2/g$, or even more than 200 $m^2/g$.

The coating step can be controlled. Specific parameters which can be controlled are: temperature of application of the layer, pressure (0 bars up to 200 bars), formation of a void before starting the coating, speed of application, type of application, the use of solvent(s), the presence of additives, the presence or not of humidity, the speed of coating, the viscosity of the coating composition, the curing, etc.

After the curing, cooking or burning of the coating layer, the combustion chamber or at least the coated wall(s) thereof is advantageously washed. The primary catalyst coating have properties which varies from the catalytic charge used (such as cerium based catalyst), from the additive (such as carbon particles, oils, etc), the size of the particles, the type of composition applied (solution, dispersion or suspension, vapor, etc.), etc.

After said washing (possibly with a gas flow for blowing solid particles not correctly attached to the wall) and possibly a drying step, the coating is advantageously controlled so as to have a minimal $NO_x$ reducing activity. Such a control is for example operated by introducing or forming a $NO_x$ containing gas in the combustion chamber and by determining the $NO_x$ content of the gases flowing out of the chamber.

The flue gases when containing some cerium particles, especially those produced by the process of the invention, can also be used for treating polluted gases, as said flue gases have reducing properties.

The primary coating or catalyst is advantageously carried out in specific conditions, for example in a specific environment. Such a primary coating is for example made in specific plants, whereby the quality of the primary coating can be controlled easily. The primary coating or catalyst can be deposited in successive steps up to reaching the requested coating for ensuring a minimal $NO_x$ reduction. For example, after a first coating and burning, the efficiency of the deposit is tested. In case the deposit is not sufficient, further catalyst is deposited and burned. The new obtained coating is further tested. If the efficiency is still not sufficient, the coating and burning steps are repeated.

The primary catalyst or coating is advantageously deposited in the combustion chamber (i.e. advantageously in the form of adjacent spots on one or more walls thereof, preferably substantially on all the wall of the combustion chamber, with zones free of primary catalyst between spots) after a washing or cleaning step. Such a step is for example a decoking step or a step for removing carbon or coke residue. Such a washing is for example carried by means of an active liquid, such as an acidic liquid composition and/or a peroxide containing composition. Possibly, prior said cleaning step, the combustion chamber is heated, for example with hot air or hot oxygen enriched air or is contacted with pure oxygen. The washing can also be operated by a solid particles (such as sand) blasting step. Such a sand blasting step can be advantageous for increasing the adherence of the primary coating.

Advantageously, thereafter, a further washing step is operated so as to remove the residue of the prior washing step.

The chamber is then advantageously dried for example by means of filtered dry air (such as hot filtered dry air).

The invention relates also to an internal combustion engine provided with at least a combustion chamber of the invention, said engine comprising preferably a series of distinct combustion chambers.

It has further been observed that when using in such an engine (such as a car or a truck) with all the wall of combustion chamber coated with adjacent spots of a primary catalyst and with adequate regeneration, the combustion speed of the fuel was better controlled, so as to ensure localized deflagration or combustion zones or points which are controlled during the time and in the space, whereby ensuring a longer combustion time, whereby reducing the impact due to the detonation (due to the pressure created during a combustion step and/or hot surface and/or red hot carbon particles free or attached to the surface of the combustion chamber or to parts thereof, especially when said particles are freed due to the use of excess of additives) of the fuel mixture containing unburned hydrocarbons formed during a first combustion step and/or a residual of unburned hydrocarbons from a prior combustion step, and whereby obtaining a more adequate use of the energy of the fuel. The motor had also a better torque and a better volumetric efficiency. After the ignition of the combustion, the characteristics of the combustion correspond to characteristic of a lean burn combustion, even if at the inlet and at the exhaust, the characteristics correspond to characteristics corresponding to a stoechiometric working. It is possible therefore to combine the advantages of a lean burn combustion with the advantages at the exhaust of a stoechiometric combustion. Such a controlled combustion enables to limit or avoid the immediate peak of temperature, and ensures a gradual increase of temperature.

The invention relates thus to an internal combustion engine with ignition means (by ignition means is meant any physical, mechanical, chemical means suitable for starting the ignition, such means are for example spark plug, compression, laser, UV, IR, HCCI, CAI, etc., or means suitable for reaching the auto inflammation), in which the combustion is catalyzed and controlled in a closed chamber with a variable volume due to the movement of the piston.

Said chamber is provided with at least one opening controlled by a means ensuring its closing or its opening. The working of the engine comprises at least one or more steps for admitting an air containing medium and fuel in the combustion chamber, a compression step of at least the air containing medium, at least a combustion step, and a step for exhausting flue gases of the combustion outside the chamber. The step for admitting at least an air containing medium in the combustion chamber is characterized by a filling rate of at least 80% of the chamber, advantageously of at least 90% of the chamber, and by an exhaust step characterized by a depression peak of less than 0.6 bar substantially immediately after the opening of the combustion chamber.

Advantageously, during the intake step of at least an air containing medium, a depression peak of less than 0.5 bar is created in the combustion chamber.

Preferably, the combustion step comprises essentially a first combustion step up to an average pressure below 25 bars and a second combustion step from a pressure of 25 bars up to an average pressure of about 40 bars, whereby said first and second combustion steps define a pressure line on a graph giving the pressure expressed in logarithm in function of the time, said graph having a scale such that the distance between log 1 bar and log 10 bar is equal to 2.71 cm, while the linear time scale is 10 cm for each 0.002 second, whereby the angle formed between the pressure line for the first combustion step and the pressure line for the second combustion step is greater than 120°.

According to an embodiment, a pressure of at least 50 bars is reached and maintained in the combustion chamber during the combustion for at least a volume increase corresponding to at least 3% of the maximum volume of the chamber, advantageously at least maintained within a range of volume increase or expansion from 3% of the maximum volume to 8% of the maximum volume of the combustion chamber, such as maintained for a volume increase up to 10% of the maximum volume or even more such as 12%, 15%, 20%, 25% of the maximum volume.

According to an embodiment, an average maximum pressure is reached for a burning rate of about 50%, and maintained advantageously up to a burning rate of 90%.

According to an embodiment, the engine uses a liquid fuel selected from the group consisting of diesel and petrol (said petrol or diesel being advantageously substantially free of cerium/europium/ytterbium and/or praseodymium), said engine having a volume cylinder content of less than 1000 $cm^3$, advantageously less than 500 $cm^3$, such as 200 $cm^3$, said cylinder being possibly associated to one or more adjacent cylinders, for example for an engine with a maximal combustion volume of less than 4 liters, advantageously of less than 3 liters, preferably of less than 2 liters and a shaft driven in rotation for producing a nominal torque, said nominal torque being selected from the group consisting of nominal torque measured at about 2000 rpm for diesel fuel, nominal torque measured at about 4000 rpm petrol fuel. The engine can be provided with or without turbo or supercharger. The engine is then characterized by a ratio maximal combustion volume expressed in $cm^3$/nominal torque expressed in Nm of less than 13, advantageously of less than 12, preferably of less than 10, such as less than 9 or even less than 8.

A further invention relates to an internal combustion engine in which the combustion is operated in a chamber with a variable volume (variable during the time) at least due to the movement of the piston(s), whereby the combustion is catalyzed and controlled so that at the exhaust stage of the combustion, the combustion has substantially characteristics of the exhaust stages of a stoechiometric combustion, while between said ignition stage and exhaust stage, the combustion has characteristics corresponding substantially to a lean combustion, even if at the inlet, the inlet gas has characteristics corresponding substantially to a stoichiometric mixture.

For example, the internal combustion engine of the invention is an internal engine in which the combustion is operated in a chamber with a variable volume, whereby the combustion is catalyzed and controlled so that, especially when the engine is adapted with a stoichiometric air/fuel ratio at the inlet, the combustion gases at the outlet of the combustion chamber and/or after the exhaust manifold and/or after the catalytic converter have a hydrogen content of more than 0.5% by volume (such as more than 1%, for example between 1 and 3%), substantially no NO, substantially no HC, an oxygen content of more than 4% (such as between 5 and 10%, for example from 5.5 to 7%) and a water content of more than 15% (such as more than 18%, for example from 20 to 30%). Such an engine is especially an engine burning liquid fuel, such as liquid hydrocarbon with more than 4 carbon atoms, for example petrol or diesel.

The maximum volume of the combustion chamber can also be varied by using special rods or pistons and/or by using time variable combustion chambers connected therebetween by an open channel, or by using a movable head cylinder, etc. When varying the maximum volume and/or the minimal volume, it is possible to adapt the compression rate. The engine can thus be an engine with a variable combustion rate.

The invention further relates to part of an internal combustion motor, namely:

an ignition spark provided with a cerium/europium/ytterbium and/or praseodymium deposit deposited in less than 24 hours, preferably in less than 12 hours, most preferably said deposit being carried in the absence of combustion gases with a $NO_x$ content of more than 500 ppm, an outlet part or portion (such as a pipe, a filter, a muffler, a silencer, a sound reducing apparatus, etc.) provided with a cerium/europium/ytterbium and/or praseodymium deposit deposited in less than 24 hours, preferably in less than 12 hours, most preferably said deposit being carried in the absence of combustion gases with a $NO_x$ content of more than 500 ppm, an exhaust gas recycling tube (EGR) or portion thereof provided with a cerium/europium/ytterbium and/or praseodymium deposit deposited in less than 24 hours, preferably in less than 12 hours, most preferably said deposit being carried in the absence of combustion gases with a $NO_x$ content of more than 500 ppm, an injector or nozzle for introducing fuel or water vapor in the combustion chamber provided with a cerium/europium/ytterbium and/or praseodymium deposit deposited in less than 24 hours, preferably in less than 12 hours, most preferably said deposit being carried in the absence of combustion gases with a $NO_x$ content of more than 500 ppm, a tube for admitting water vapor or fuel to a nozzle or injector, said tube being provided with a cerium/europium/ytterbium and/or praseodymium deposit deposited in less than 24 hours, preferably in less than 12 hours, most preferably said deposit being carried in the absence of combustion gases with a $NO_x$ content of more than 500 ppm, a throttle provided with a cerium/europium/ytterbium and/or praseodymium deposit deposited in less than 24 hours, preferably in less than 12 hours, most preferably said deposit being carried in the absence of combustion gases with a $NO_x$ content of more than 500 ppm.

The water vapor or hot water or hot aqueous medium or hot alcohol containing medium (preferably liquid) or hot glycol containing medium (preferably liquid) is advantageously directly injected (for example sprayed or nebulized in case of liquid) in the combustion chamber. However said water vapor or hot water or hot aqueous medium can be formed in a specific heating device admitting the water vapor or hot water or hot aqueous medium in the air admission (inlet, inlet manifold, etc., preferably after throttle). The heating device comprises a heating chamber provided with heating means (advantageously heating walls), a water admission means for controlling the water flow in the chamber, and an opening (possibly with variable opening section) for the transfer of water vapor or hot water or hot aqueous medium or hot liquid medium containing alcohol/glycol in the air flow towards the combustion chamber.

An aspiration of water vapor out of the heating chamber is created by the airflow. The chamber has advantageously an ovoid form or a substantially ovoid form. The wall or a portion thereof are for example coated with a cerium/europium/ytterbium and/or praseodymium containing layer, advantageously said layer further containing an aluminum silicate, preferably a hydrated aluminum silicate. The chamber is advantageously provided with an oxygen containing gas (such as air) inlet, so that a mixture air/water vapor escape the chamber.

In case of hot water or hot aqueous medium, a means for pressurizing the hot water or hot aqueous medium is advantageously used, such as a pump, a compressor, a jack, etc.

According to a possible embodiment, water vapor passes through a chamber having a substantially ovoid form In this embodiment, the chamber is not associated with heating means. The water vapor can be formed in a specific tank, by heating means associated to the pipe linking the chamber to a water tank. The heating means are for example sufficient for heating the water to a temperature comprised between 40° C. and about 100° C. Possibly a gas containing water (for example flue gases, recycled exhaust gases) can be used for contacting the cerium/europium/ytterbium and/or praseodymium present in the chamber.

BRIEF DESCRIPTION OF THE DRAWINGS

FIG. 15 is a schematic graph representing the pressure in function of the combustion time FIG. 16 is a graph showing the gas emission for a normal combustion for an internal combustion engine and for a combustion according to the invention

Figure 1:
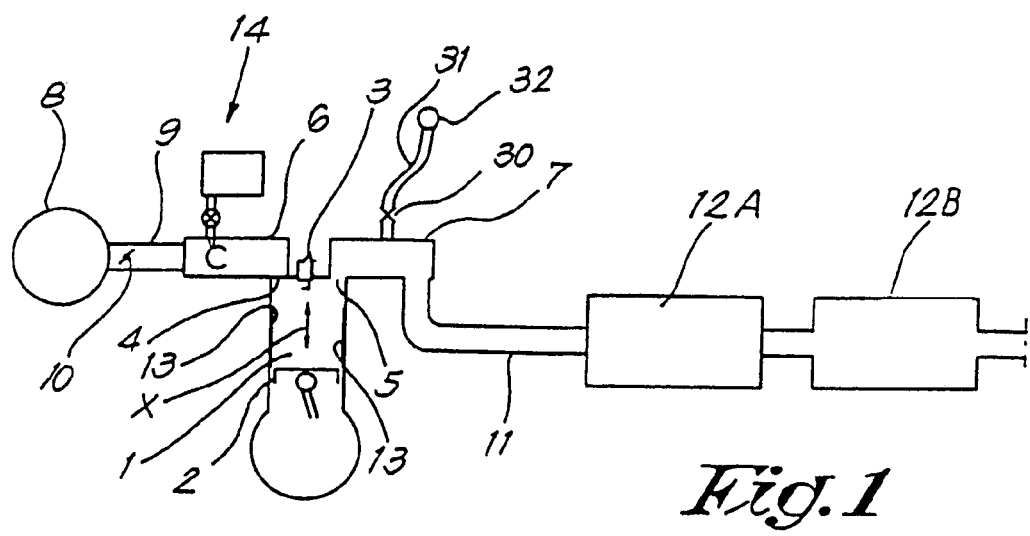
FIG. 1 is a schematic view of an internal combustion motor of the invention (one piston being drawn)

The motor of FIG. 1 comprises several combustion chambers 1 in each of which a piston 2 is moved (arrow X). A spark 3 is used for the ignition of the mixture air-fuel present in the chamber 1. Valves 4,5 are actuated so as to allow the inlet of air and combustible in the chamber 2 and the outlet of flue gases out of the chamber 2. The motor comprises also: an intake manifold 6, an outlet manifold 7, an air filter 8, a pipe 9 with possibly a valve 10 for controlling the fuel consumption, an outlet pipe 11, a filtering system 12A for the flue gases (for example for further oxidizing thereof, for trapping particles, 3-ways catalyst system, etc) and a soot trap system 12B. The engine of FIG. 1 is a four stroke engine using for example diesel as fuel.

Figure 14:
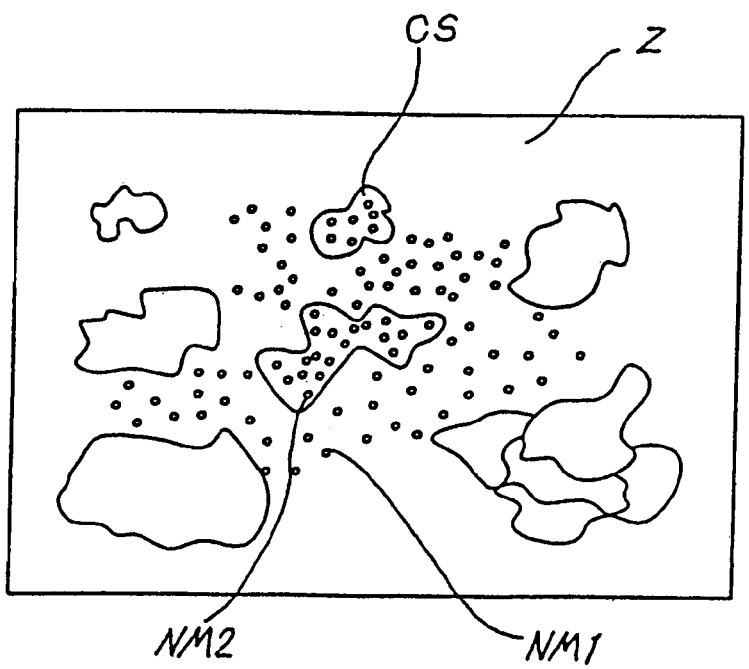
FIG. 14 is an enlarged schematic view of a primary coating.

The lateral cylindrical wall of each combustion chamber 2 is provided with a thin catalyst coating 13, said coating 13 being homogeneous or homogeneously dispersed on said wall, in the form of adjacent spots (see FIG. 14). For example, said catalyst coating comprises one or more elements selected among the group consisting of Pt, Pd, Ce, Eu, Yb, Pr, La, Rh, etc. The coating is such that an average reduction of the $NO_x$ formation can be achieved. Such a coating is for example applied by plasma spray, spray, dipping, curing, etc. with or without precleaning step, for removing partly or completely the remaining carbon particles. Said catalyst coating comprises a series of catalyst spots CS adjacent the one to the other, some of which contacting each other. Zones Z remain however free of catalyst deposit or poor in catalyst deposit. For example, the spot CS are rich in lathanides, for example with a content of 20 to 50% La and/or Ce (content by weight determined as atom). The spots have an average size of less than 100 μm, advantageously of less than 25 μm, preferably of less than 10 μm. The surface is advantageously provided with a quite homogeneously distributed particles with a size of less than 1 μm, i.e. nanoparticles such as particles with a size of less than 500 nm, and even less than 250 nm, such as less than 100 nm, less than 50 nm. Said nanoparticles comprises nanoparticles NM1 with a high lanthanide and/or cerium and/or europium content (such as a total (lanthanide+cerium+europium) content of more than 10% by weight, advantageously of more than 20%, for example comprised between 25 and 40%, said weight content being measured as atoms), and nanoparticles NM2 with a low lanthanide and/or cerium and/or europium content (such as a total (lanthanide+cerium+europium) content of less than 10% by weight, advantageously of less than 5%, for example comprised between 0.5 and 3%, said weight content being measured as atoms). Said nanoparticles NM2 are located essentially in spots CS present on the surface.

The nanoparticles NM1 and NM2 have advantageously a metal content (such as Cu, Zn, Pt, Au, Ag, Cr, Al, Pd, Ni and mixtures thereof) of more than 5% by weight, preferably of more than 10% by weight, such as between 15 and 50% by weight (said metal content being measured as atomic metal content).

The motor is associated with a system 14 for treating, when required, the primary catalyst coating 13.

The treatment is controlled so that the average $NO_x$ content of the flue gases (average measured on combustion period of 1 hour) remains substantially constant. (see FIG. 3)

Said system 14 comprises: a water tank 15, an ovoid water vapor distributor 16, a pipe 17 connecting the water tank 15 with the vapor distributor, a valve 18 mounted on the pipe for controlling the water flow out of the water tank, and a heating system 19 (associated to the pipe 17) for converting the liquid water into vapor. The vapor distributor is placed in the intake manifold 6. The distributor 16 has an ovoid inner chamber 16A provided with an air inlet opening 16B and with an air/vapor outlet opening 16C. Air flows in the inner chamber 16A (from the inlet 16B towards the outlet 16C) according to a turbulent pattern so as to ensure a good mixing of the air with the water vapor. The wall of the vapor distributor are coated with a cerium containing coating. The coating comprises from 10 to 25% by weight of wolframite clay, and 90 to 75% weight of a rare earth containing composition containing about 50% Ce, 20–26% La, 15–19% Nd, 5–6% Pr, trace of Europium and trace of ytterbium. The weight ratio rare earth composition/wolframite clay was comprised between 3 and 9. When the air/water vapor mixture contacts the Ce containing catalyst, said air/water vapor is charged with nano particles of wolframite clays and/or rare earth. Due to the turbulence of the air in the ovoid chamber, a good contact can be provided between the air/water vapor flow and the Ce containing coating. The turbulence is also advantageous for ensuring the formation of a substantially homogeneous air/water vapor flow with Ce particles (preferably nanoparticles) and with refractory particles. When the water vapor formed in the pipe 17 flows into the ovoid chamber 16, said water vapor is mixed with air, said mixture having then a temperature comprised between 60 and 70° C.

The air/water vapor flowing out of the ovoid chamber flows in the intake air manifold 6 before flowing in one combustion chamber. The outer wall of the ovoid shaped distributor is provided with fins 20 so as to induce a rotational inwards movement to the principal air flow A.

It is advantageous to use systems, such as an ovoid chamber, provided with cerium/europium/ytterbium and/or praseodymium containing element(s) having a face in contact with water vapor, said element(s) being such that the surface in contact with water vapor remains substantially constant during the use of the system, for example for more than 75,000 Km, such as more than 80,000 km, more than 100,000 km or even more than 150,000 km, or even more than 200,000 km. In said combustion chamber, fuel is for example injected by means of controlled nozzles 20.

At least the air/water flow with nano particles of cerium and possibly refractory material is submitted to a compression (pressure of 5 to 20 bars), before being used for the combustion. Advantageously at the end of the compression step of the air/water vapor flow, fuel is injected.

Thereafter, the flame ignition is started by the spark. Due to the explosion, the temperature and the pressure in the combustion chamber raise sharply up to a pressure of 60–100 bars (or even more) and up to a temperature (average) of about 700–1000° C. (or even more). Due to the explosion, some cerium particles and refractory materials impacts the primary coating, whereby ensuring a treatment of said primary coating (at least partial regeneration of the primary coating) and a partial post coating of the wall of the combustion chamber. Furthermore, it has been observed that the presence of cerium nano particles and refractory nano particles in the volume of the combustion chamber had also a catalytic effect on the combustion reaction (better control of reaction, $NO_x$ reducing effect, etc.).

The rate of addition of cerium containing catalyst was adjusted so as to be about 0.5 to 50 ppm per liter of fuel, preferably between 0.5 and 20 ppm per liter, such as 0.5 ppm, 1 ppm, 3 ppm and 5 ppm. The rate of water vapor addition was adjusted so as to be about 0.005 l to 0.1 l water per liter of fuel, advantageously between 0.01 and 0.075 l water per liter of fuel.

Figure 3:
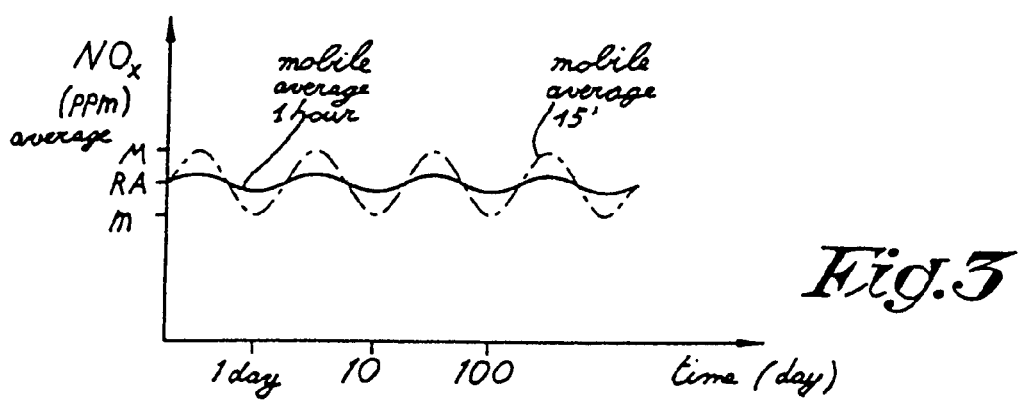
FIG. 3 is a schematic view showing variation of $NO_x$ content in the flue gases.

FIG. 3 is a schematic diagram of the average $NO_x$ content in the flue gases (mobile average measured on a period of 1 hour working) in function of the time. As it can be seen from the starting of the engine, a substantially constant reduced $NO_x$ content could be achieved in the flue gases. For example, the average reduced $NO_x$ content in the flue gases was lower than about 30 ppm (such as lower than 20 ppm), meaning a reduction of more than 50%, advantageously of more than 75%, preferably of more than 80% of the $NO_x$ content when no primary coating and no cerium/europium treatment are operated. In dashed line, the $NO_x$ mobile average content on a period of 15 minutes is represented. The regeneration of the system is operated as follow: As long as the $NO_x$ mobile average content on a period of 15 minutes is lower than a predetermined threshold value (M, for example corresponding to 1.3× the requested average RA), no regeneration of the catalyst coating is operated by admission of cerium and/or europium compound in the combustion chamber. When the $NO_x$ mobile average content on a period of 15 minutes is higher than the predetermined threshold value (M, for example corresponding to 1.3× the requested average RA), regeneration of the catalyst coating is operated by admission of cerium and/or europium and/or ytterbium and/or praseodymium compound in the combustion chamber. Said regeneration is for example carried out up to reaching a minimum threshold value (m, for example a value corresponding to about 0.7× the requested average RA). The regeneration or not of the primary catalyst can be controlled for example by controlling the valve 18, i.e. water vapor is admitted in the ovoid chamber 16 when regeneration of the coating catalyst is required. This enables a better use of the cerium/europium/ytterbium and/or praseodymium particles used for regeneration and a better efficiency of the catalyst, as it is well-known that an excess of catalyst will catalyze also secondary reaction, such as undesirable secondary reaction.

Figure 4:
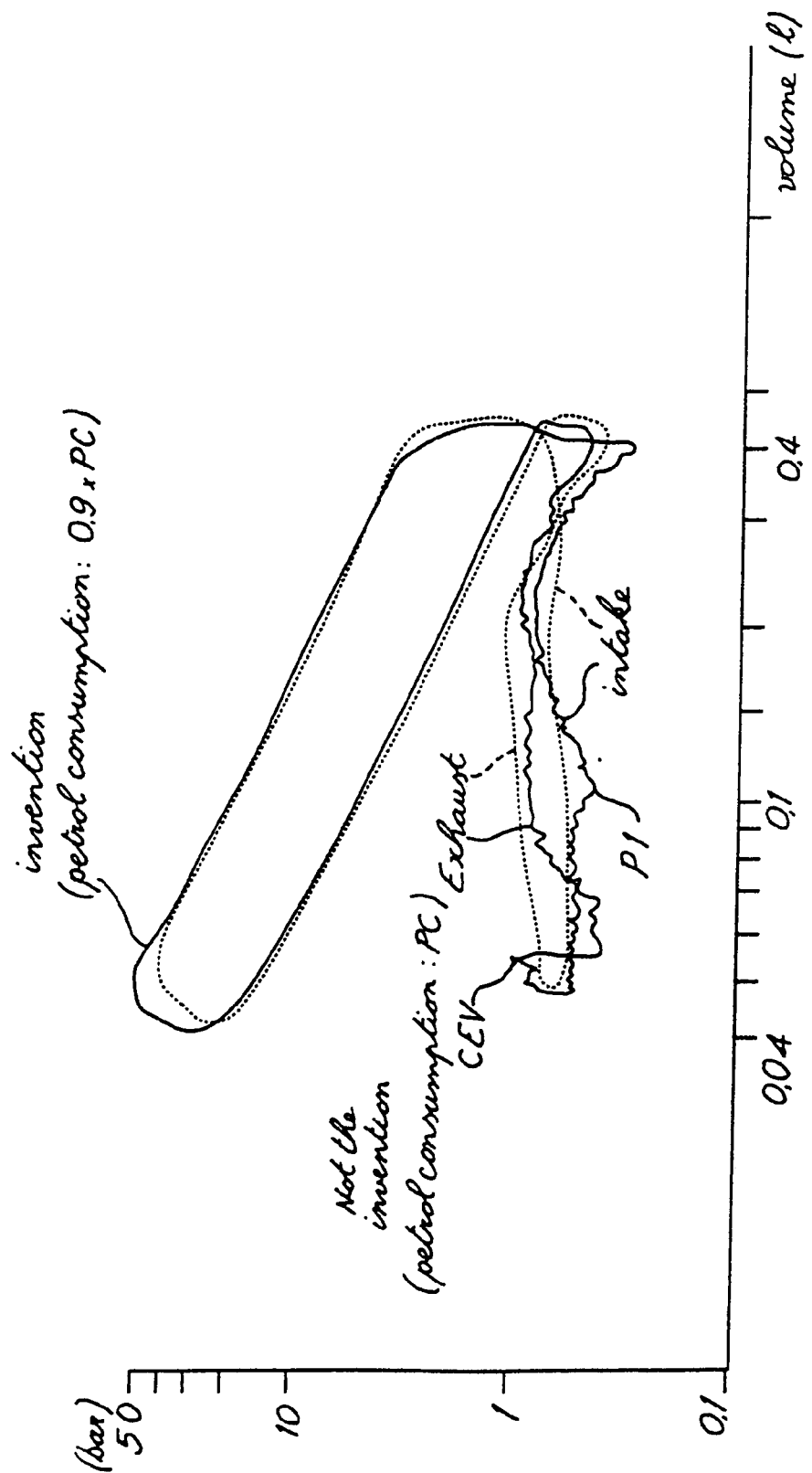
FIG. 4 is a schematic view of the Pressure/Volume diagram in the combustion chamber of the invention, and in the combustion chamber not according to the invention.

FIG. 4 is a schematic Pressure/Volume diagram (P/V) showing the pressure in the combustion chamber, for a device of the invention (invention) and for a device not coated with a primary $NO_x$ coating, nor provided with a system for injecting water vapor and cerium in the intake air (dashed line, not invention). The consumption for the P/V diagram in the combustion chamber of the invention was 10% lower than the consumption for the P/V diagram in dashed line (not the invention). As it can be seen from said graph, the pressure in the chamber during the intake (measured at the level of the spark) shows depression peaks, creating a better suction of air in the chamber and therefore a better filling of the chamber. The volume filling rate of the chamber is for example greater than 90 or 95%. While not being bound to any theory, it seems that during the intake some reaction or absorption at the coated surface (oxidation and/or oxygen absorption and/or water absorption and/or mist formation), whereby reducing the pressure in the chamber. This lower pressure during the intake seems also be due to a better exhaust of the combustion gases. The depression peak (P1) in the chamber is for example lower than 0.5 bar. At the end of the intake, as soon as the valve is closed (i.e. the chamber is closed) the pressure in the chamber increase quickly to about 1 bar ($10^5$ Pa), and during the compression step a higher compression pressure is obtained. This can be due to the higher filling rate of the chamber and/or due to the release of product at the catalyst coating and/or due to the transformation of the disappearance of some mist.

At the end of the compression stroke, a pressure of about 20 bars was reached, although said maximum compression was only of about 17 bars for the device not according to the invention.

The combustion step was better controlled, as the pressure in the combustion chamber increased more quickly and was maintained at a higher level than for the device not of the invention. The exhaust gases are also better take away, as at the end of exhaust stroke (closing of the exhaust valve CEV) the depression in the chamber is lower.

During the exhaust, the pressure in the chamber was lowered with respect to the engine not or the invention, this meaning that a suction was created as soon as the valve was opened.

Figure 17:
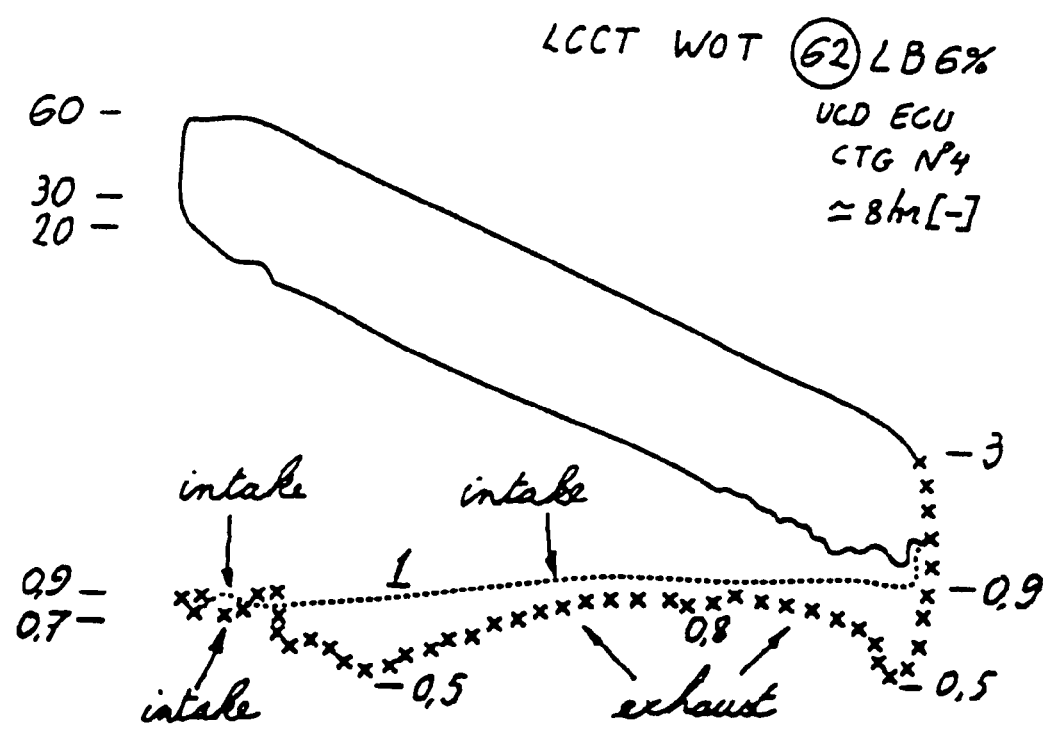
FIG. 17 is a pressure/volume diagram for a combustion of the invention (wide open throttle)

FIG. 17 is another view of a P/V diagram obtained with a combustion process of the invention with wide open throttle. In said diagram, the high pressure level (more than 50 bars) in the combustion chamber was maintained during the expansion (up to a volume corresponding to about 30% of the maximum volume of the combustion chamber.

Figure 18:
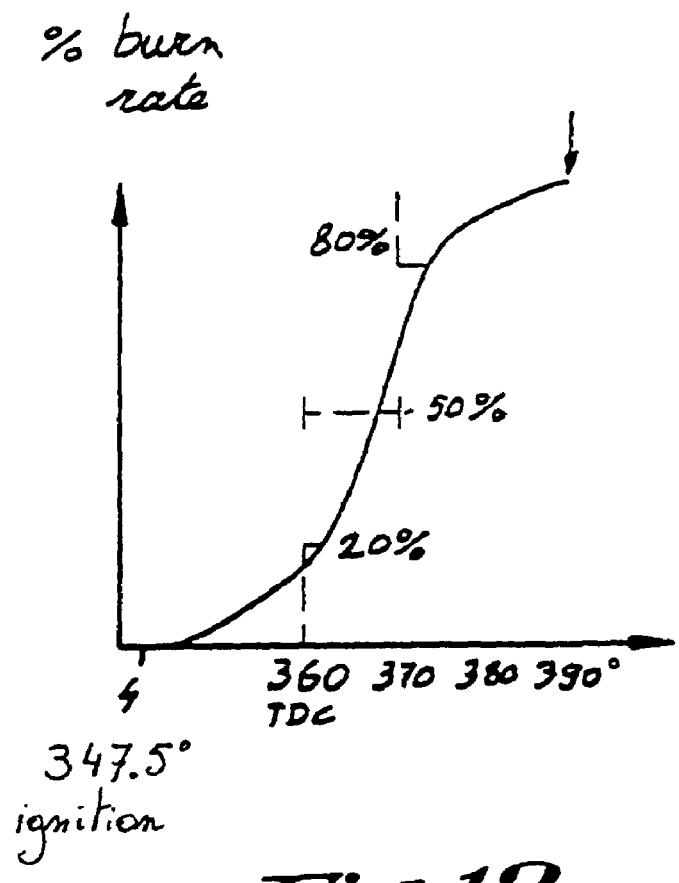
FIG. 18 is the diagram showing the burning rate in function of the time (expressed in ° of rotation of the shaft) for the combustion of FIG. 17.

FIG. 18 shows the combustion rate of the combustion of FIG. 17. Said figure shows that the combustion from 20% of the fuel up to about 80% of the fuel extends on a period corresponding to a (shaft) rotation of about 10°. The maximum pressure was reached after a burning rate of about 50%, said maximum pressure being maintained up to a burning rate of about 99%.

Figure 19:
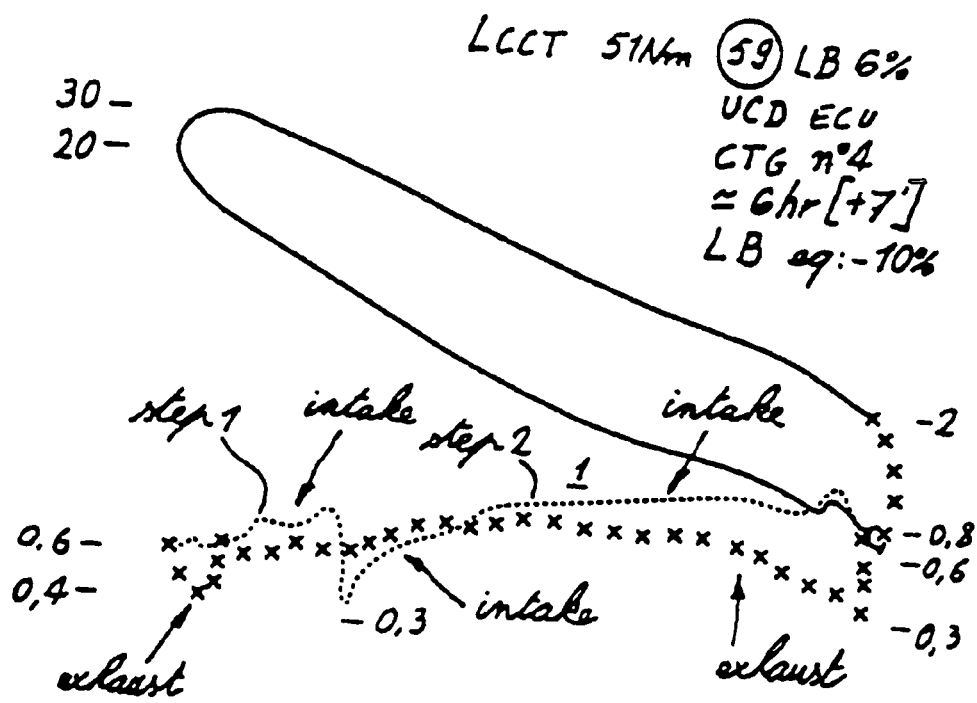
FIG. 19 is a pressure/volume diagram for a combustion of the invention (torque 51 Nm)

FIG. 19 is a view similar to FIG. 17, but for a torque of 51 Nm. As it can be seen from said drawing, as soon as the exhaust valve is opened, a peak of depression is created in the combustion chamber (pressure of about 0.4 bar). This depression seems to be due to a better aspiration of exhaust gases in the exhaust piping, for example due to a water condensation. The intake comprises a step for which the inlet valve and the exhaust valve are in open position (step 1), and a step for which the inlet valve is open, while the exhaust valve is closed (step 2) Between the two steps, a depression peak is formed. It suggests therefore that in step 1, portion of exhaust gases of the exhaust piping are sucked back in the combustion chamber, whereby a exhaust gas recirculation is carried out without supplemental piping, said exhaust gas recirculation being due to a physical or chemical effect of the coating.

Figure 20:
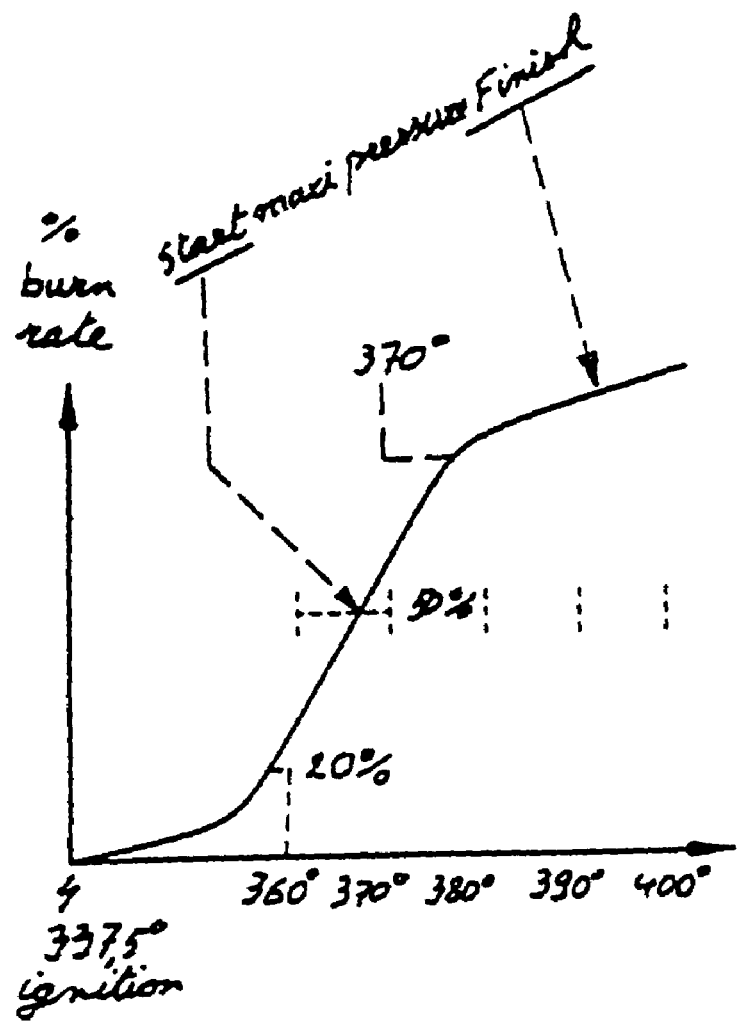
FIG. 20 is the diagram showing the burning rate in function of the time (expressed in ° of rotation of the shaft) for the combustion of FIG. 19, FIGS. 21A and 21B are a schematic Pressure/volume diagram of a combustion cycle for a motor of the invention and for a motor not of the invention.

The variation of burn rate (%) of the combustion of FIG. 19 is shown in FIG. 20. As it can be seen the combustion from 20% of the fuel up to 80% of the fuel is carried out in a period corresponding to about 20° of rotation of the shaft. The maximum pressure or high pressure level is reached after a combustion of about 50% of the fuel, said high pressure level being than maintained up to a substantially complete burning, i.e. to a volume corresponding to an angular rotation of about 35° with respect to the top dead center.

A better control of the combustion can thus be operated in the device of the invention. FIG. 15 shows schematically the variation of the pressure in a combustion process of the invention for a torque of 51 Nm, while in dashed line the variation of pressure in a combustion process not according to the invention for a torque of 51 Nm is shown. The consumption for the motor of the invention was 10% lesser than for the motor not of the invention.

The time is expressed in said drawing as a number of degree (°) of the angle of rotation of the driving shaft. The time is not calculated from the ignition, but is relative (i.e. time 0 is not the true ignition time).

As it appears from said graph, the combustion in the method of the invention is more controlled, as said combustion is carried in two steps, a first step up to a pressure of about 25 bars (substantially linear increase when expressing the pressure as a logarithm function) followed by a second step of rapid linear increase of the pressure (when expressed as a logarithm function). A variation of about 1° for a rotation of the shaft of about 2000 rpm corresponds to less than about 0.00009 second.

With a classical combustion, the combustion is carried out as an explosion of all the combustible material present in the combustion chamber, the pressure increase is operated substantially immediately.

The angle α1 defined between the two increase steps for the combustion of the invention is higher than 105°, such as about 120 to 150°. The angle α2 for a combustion not according to the invention is about 100°. A larger angle means a longer burning time, meaning a best flame stability. While the working of the combustion of the invention is still unclear, it is suspected that the presence of the catalyst coating and/or volumetric catalyst controls the combustion, by forming successive small or local deflagrations or combustions, the number of local deflagrations or combustions being increased in the second combustion step. It was also observed that in the combustion process of the invention, a higher pressure could be reached in the combustion chamber and that said high pressure could be maintained during a longer period. It seems that part of an explanation of the better control of the combustion is due to the formation of hydrogen species along the coating.

It was even observed that when controlling the air admission ratio with respect to the fuel consumption as being for a substantially stoichiometric combustion in a conventional motor, the combustion in the chamber of the engine of the invention resembles to a lean combustion, while at the outlet, the flue gases had substantially the characteristics of the flue gases of a stoichiometric combustion. Such fact was especially observed when admitting a rare earth (especially cerium and/or europium and/or ytterbium and/or praseodymium), possibly together with a refractory material, in the combustion chamber.

While not bound to any theory, it seems that when introducing cerium/europium/ytterbium/praseodymium (and possibly a refractory material) into the combustion chamber, a reduction phase occurs during the oxidation (combustion). The presence of the cerium/europium/ytterbium/praseodymium (advantageously together with refractory material) dispersed in the volume of the combustion chamber seems to modify the reaction conditions, the reaction speed and the transitional states of the combustion.

The flue gases escaping the chamber were thereafter treated in a three way catalyst so as to trap the possible cerium containing particles present in the flue gases. The working of the three way catalyst was improved and the live time of said three ways catalyst was increased.

The flue gases were analyzed.

This analysis shows the following results
- less fuel consumption for the same work
- substantially no CO in the flue gases (less than 0.3%, advantageously less than 0.2%, preferably less than 0.1%)
- substantially no particles in the flue gases (substantially no soot or carbon particles or cerium containing particles)
- better torque
- no knocking
- less $SO_2$ (less than 20 ppm, such as less than 10 ppm)
- better engine brake
- better working of the trap system
- less corrosion of the exhaust pipe and of the trap system
- better ignition
- increased live time of the spark
- less unburned fuel present in the exhaust gases
- high oxygen content (such as more than 4%)
- better cooling of the motor, less heat transfer requested towards the coolant
- lower peak temperature in the combustion chamber.

FIG. 16 is a graph showing for a normal combustion, the evolution of $CO_2$, $O_2$, $H_2$, NO, HC (unburned) and $H_2O$ content in the exhaust gases, in function of the air/fuel ratio, i.e. for a lean combustion, for a stoichiometric combustion and for a rich combustion. The NO, HC and CO contents are expressed in ppm, while the $H_2O$, $O_2$, $CO_2$ and $H_2$ contents are expressed in % by volume. When using the combustion process of the invention, with a stoichiometric air/fuel ratio at the inlet of the combustion chamber, the oxygen level and the $CO_2$ level correspond to the level for a normal lean combustion. The oxygen content in the combustion of the invention is higher than the level obtained for a lean combustion. When using lean condition for the combustion process of the invention, the oxygen and $CO_2$ levels will correspond to level of a still leaner normal combustion. The flue gases of the combustion of the invention had a very high water content (more than 20% by volume)

It is assumed that in the combustion process, an oxydoreduction mechanism occurs, namely a mechanism ensuring a complete oxidation of C and HC into $CO_2$, and a reduction mechanism of noxious gases or other harmful gases (for example due to the presence of hydrogen). It is assumed that during the combustion process, some water vapor is dissociated in hydrogen species and oxygen species. It has also been observed that a thin deposit of cerium/refractory containing compounds was obtained on different elements in contact with the flue gases. This post deposit was even present on at least a portion of the primary coating.

Such a deposit occurs for example on the spark plug, on the exhaust valve, on the piston, on the inlet valve, on the outlet manifold, on the outlet pipe and on the gas treatment system 12. Such a deposit is advantageous for avoiding or limiting corrosion problems, for having further $NO_x$ reducing effect, for regenerating catalytic activity of the gas treatment system, for limiting and/or avoiding the deposit of soot and carbon, for further catalyzing the oxidation of compound in the flue gases, etc.

Some deposit is even made in the air intake.

It was also observed that the vibration of the motor was reduced and that the stability of the combustion flame was better or improved.

Figure 21B:
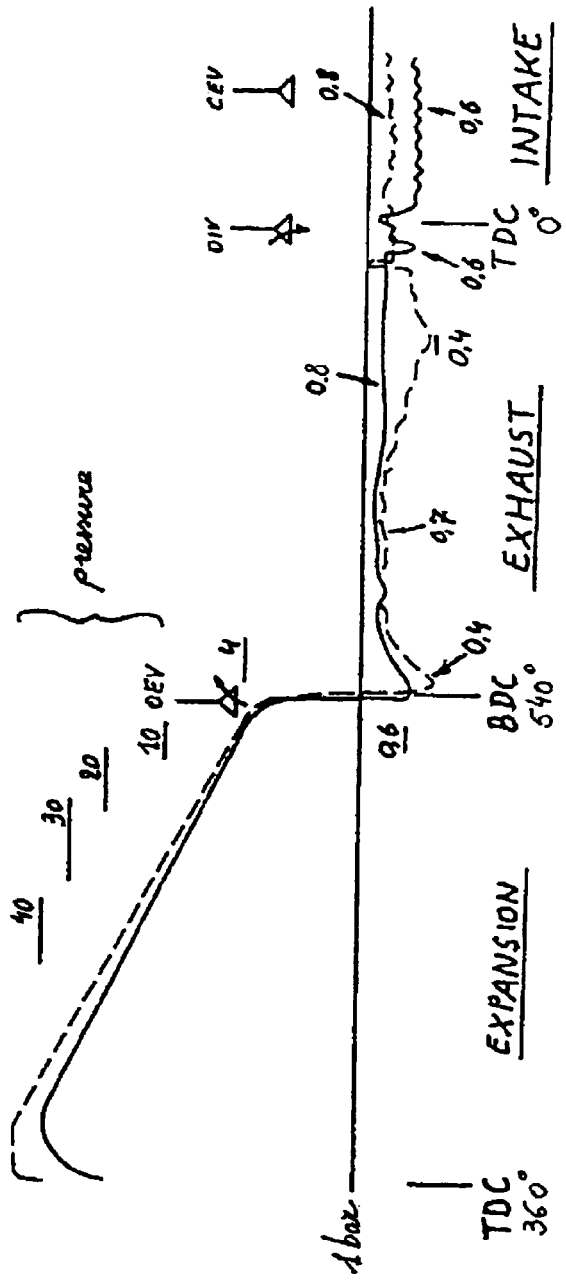

FIGS. 21a and 21B show the evolution of the pressure during the intake step, the compression step, the combustion step, the expansion step and the exhaust step for a motor of the invention with a torque of 101 Nm and for a motor not of the invention with a torque of 101 Nm, the fuel consumption in the motor of the invention being 10% lesser than the fuel consumption in the motor not of the invention. In said figure TDC means Top Dead Center, while BDC means Bottom Dead Center. The percentage of fuel burning is also given in said figures.

It appears clearly from said figure:
- that higher pressure can be obtained in the motor of the invention,
- that said high pressure can be maintained during a longer period,
- that after the opening of the exhaust valve, a higher depression is created, meaning that a better sucking of exhaust gases occurs,
- that the pressure is maintained at a lower level during the exhaust (after the opening of the exhaust valve OEV) up to the opening of the inlet valve OIV,
- that after the opening of the inlet valve OIV but before the closing of the exhaust valve CEV, the pressure is higher, meaning a better suction of air through the inlet valve (possibility to create an air wash in the combustion chamber between the inlet and the outlet, whereby a better cooling, a better filling, a delayed fuel injection, etc.), a portion of said air being further sucked in the exhaust pipe due to the depression,
- that a higher pressure is reached after the closing of the exhaust valve CEV during the intake, meaning a better filling of the chamber.

The better filling of the chamber of the motor of the invention enables to make a downsizing of the motor, whereby reducing its weight and its fuel consumption. A better filling means also to be able to reach a higher compression ratio, whereby reaching at the end of the combustion condition tending to conditions for an auto inflammation.

With respect to a motor with a torque of 101 Nm not of the invention, it was possible with a motor of the invention with a torque of 101 Nm and with a fuel consumption reduction of about 10%, to increase the average top pressure of about 25%, increase of the indicated mean effective pressure (IMEP P/V) of about 3%, decrease of $CO_2$ content of about 15%, to increase the thermal efficiency by about 9%, and to increase the volumetric efficiency of about 11%.

According to a preferred embodiment, during a non regeneration step, some water vapor was admitted in the intake air, via the pipe 17A provided with a valve 18A and a heating means 19. The admission occurs then advantageously between the ovoid chamber 16 and the combustion chamber. Such an admission is for example operated when no water vapor is admitted in the ovoid chamber 16 by the pipe 17. This enable to have the benefit of water vapor in the combustion chamber during the non regeneration step, i.e. when the primary coating is sufficiently efficient.

In case the ovoid chamber 16 is located between the admission via pipe 17A and the combustion chamber, a minimum amount of water vapor can entered in the ovoid chamber 16, whereby enabling to have a minimal cerium and/or europium and/or ytterbium and/or praseodymium content in the intake air, such as a minimal amount comprised between 1 and 100 ppb, such as 20 ppb, 50 ppb, 75 ppb. When the catalyst coating has to be regenerated, water vapor is then admitted in the ovoid chamber 16, while the water vapor admission via pipe 17A is reduced or stopped, preferably reduced.

Figure 5:
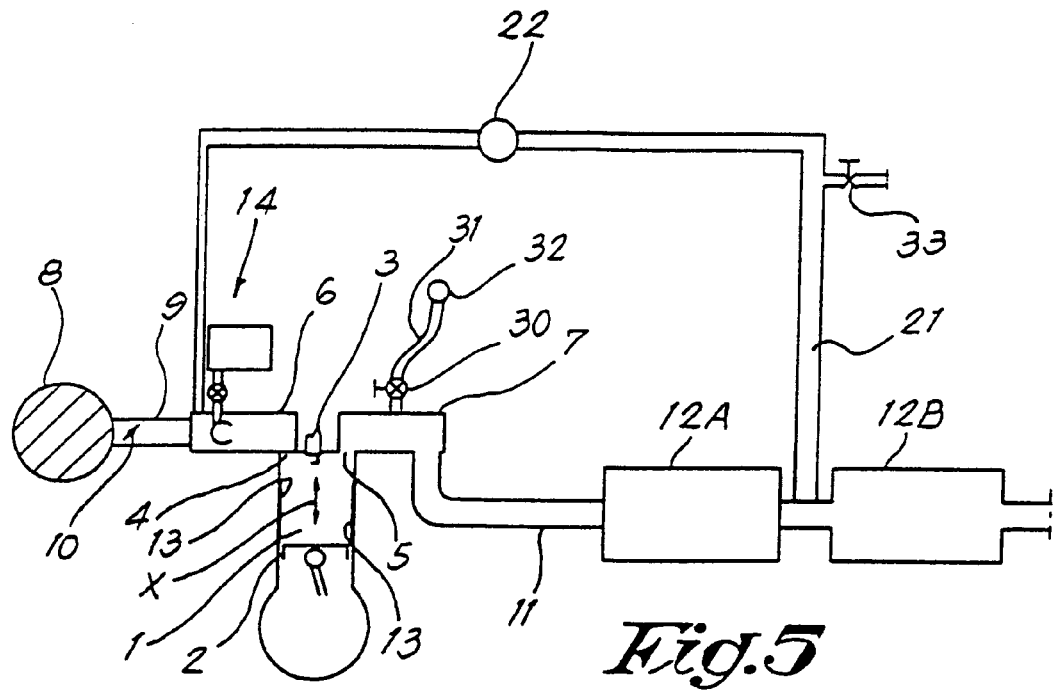
FIG. 5 is a view of an embodiment similar to that of FIG. 1, but with an exhaust gas recycling.

FIG. 5 is a schematic view of an internal engine similar to that of FIG. 1, except that the engine is associated with a exhaust gas recycling system (EGR).

In the internal engine of FIG. 5, a pipe 21 connects the outlet pipe 11 after the 3 ways catalyst or trap system 12A with the intake manifold 6. A fan or turbine or turbo fan 22 is mounted on said pipe 21 so as to ensure the suction of part of exhaust gases for recycling said sucked exhaust gases in the intake manifold 6.

By controlling the speed of rotation of the fan, turbine or turbo fan, it is possible to control the volume of exhaust gases recycled.

Figure 6:
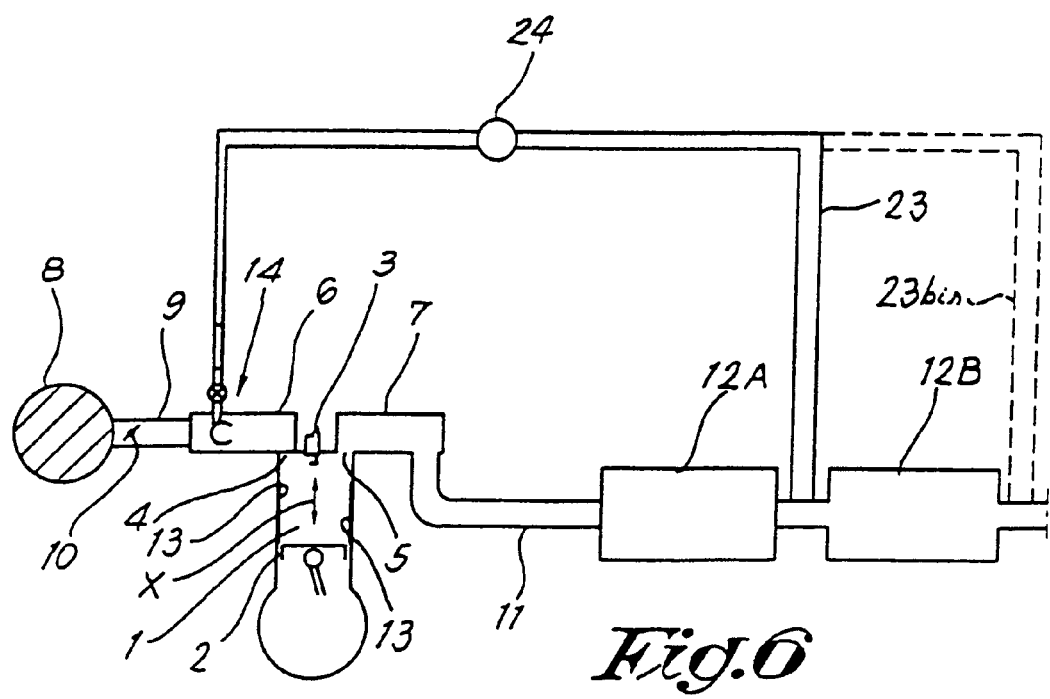
FIG. 6 is a further view of an embodiment of a motor with exhaust gas recycling.

FIG. 6 is a schematic view of another internal engine similar to that of FIG. 1, except that the engine is not provided with a device for forming vapor 14, but is provided with a recycling pipe 23 with a fan, turbine or turbo fan 24 for recycling a part of the exhaust gases into the ovoid chamber 16 (the air inlet 16B being possibly closed). Possibly, the recycling pipe can recycle combustion gases after being treated completely by the filtering system 12A and the soot trap system 12B, i.e. combustion gases ready for being exhausted in the atmosphere. Such a recycling pipe 23 bis is shown in dashed line.

Figure 7:
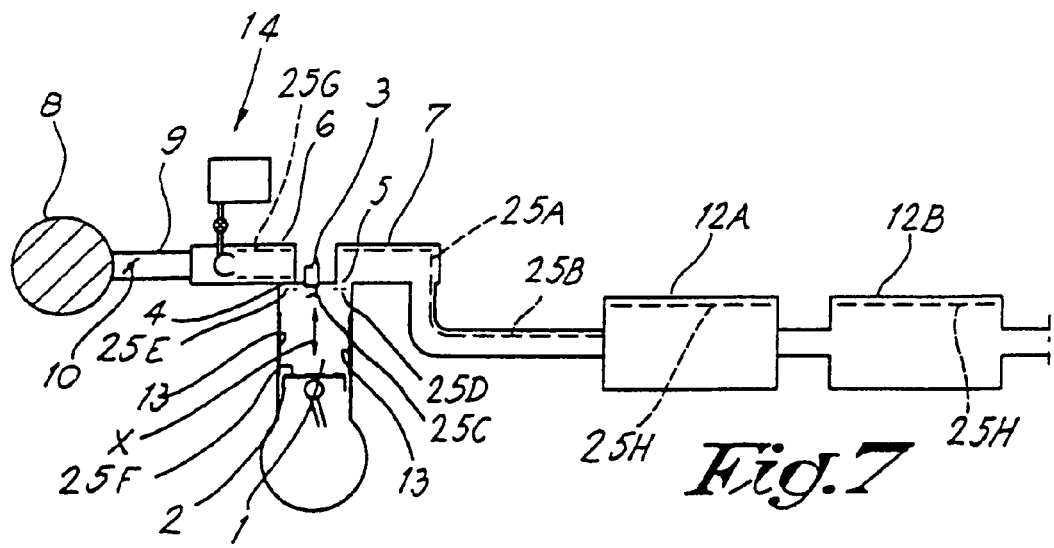
FIG. 7 is a view similar to that shown in FIG. 1, with further precoating.

FIG. 7 is a further schematic view of an internal engine of the invention, similar to the engine of FIG. 1, except that one or more of the following elements are provided with a primary $NO_x$ reducing catalyst coating 25 (shown in dashed lines). Said elements are:
  the exhaust manifold 7 with a catalyst coating 25A, and/or
  the exhaust pipe 11 with a catalyst coating 25B, and/or
  the spark 3 with a catalyst coating 25C, and/or
  the outlet valve with a catalyst coating 25D, and/or
  the inlet valve with a catalyst coating 25E, and/or
  the piston 2 with a catalyst coating 25F, and/or
  the intake air manifold with a catalyst coating 25G and/or
  the trap or oxidizing system 12A,12B with a catalyst coating 25H a.

Said catalyst coating is for example a coating comprising cerium and/or europium and/or ytterbium and/or praseodymium and at least a refractory compound.

The interest to have coating on elements in contact with hot flue gases is to enable even after the combustion step a $NO_x$ reduction, an anti soot deposit and an anti carbon deposit.

Figure 8:
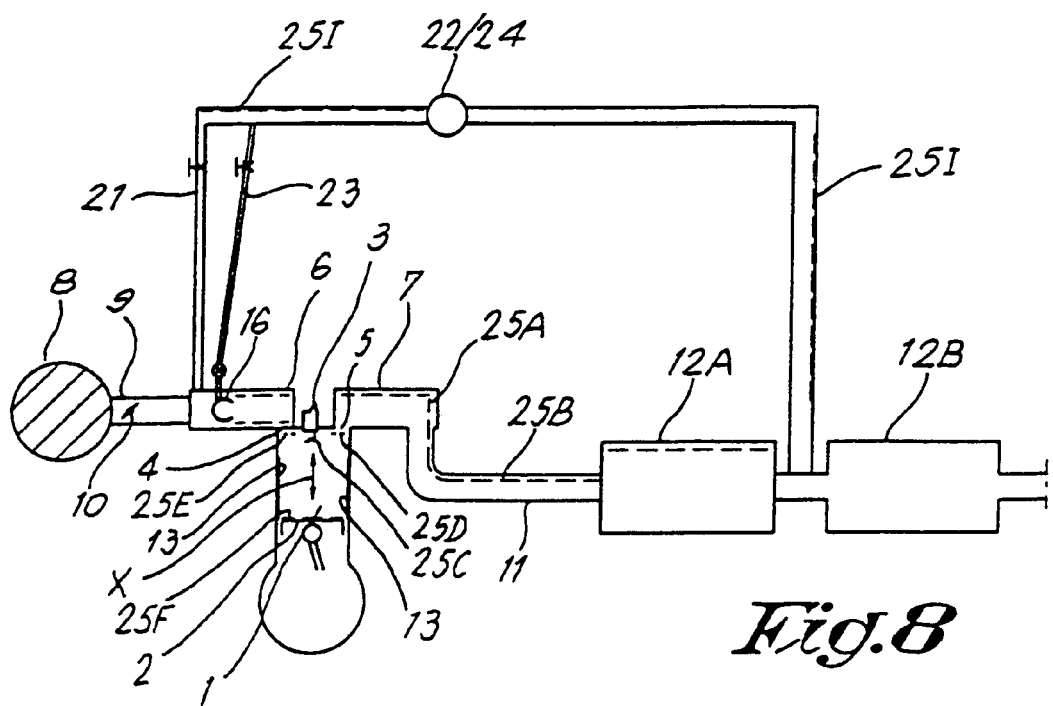
FIG. 8 to 10 are further views of embodiments of the invention

FIG. 8 is still a further view of an internal engine of the invention similar to that of FIG. 7, but provided with an exhaust gas recycling system (21,22) or (23,24). In said embodiment, at least the pipe (21,23) for recycling a part of the exhaust gases is provided with a catalytic coating 25I, such as a catalytic coating containing cerium and/or europium and at least a refractory material. Possibly in this embodiment, the ovoid chamber 16 is not necessary for the admission of cerium/europium/refractory material in the intake air.

In the devices of FIGS. 1, 5 to 8, the cerium containing compound was used for keeping substantially steady the $NO_x$ reduction. This stable $NO_x$ reduction seems to be the consequence of a regeneration or rejuvenation of the primary coating, said regeneration/rejuvenation being for example made by a partial post coating.

In the devices of FIGS. 1, 5 to 8, cerium and refractory materials were deposited on surfaces in contact with flue gases, especially the inner wall of the combustion chamber. Such a deposit is substantially homogeneous, i.e. a homogeneous dispersion of particles, said deposit being preferably only partial.

When making tests with the internal engine of anyone of the FIGS. 1, 5 to 8, it has been observed that the regeneration or rejuvenation of the primary coating was better when using simultaneously cerium and/or europium and/or ytterbium and/or praseodymium (possibly mixed with other rare earth), together with a refractory material or a precursor thereof.

While in said figures, the invention is disclosed for an internal combustion engine, the process of the invention can also be carried out for other type of combustion engines or processes using a primary $NO_x$ reducing catalyst. For example, the process of the invention can be carried out in a gas turbine, a jet, turbo jet, an incinerator, a fixed bed, a fluidized bed, HCCI, CAI, pulse combustion, etc., the combustion chamber and/or the outlet pipe of which being provided with a primary $NO_x$ reducing catalyst coating. However, preferably the combustion is made in a combustion chamber provided with a primary $NO_x$ reducing catalyst coating, in presence of cerium/europium and water vapor at least partly at a pressure higher than $2 \cdot 10^5$ Pa, advantageously at a pressure higher than $5 \cdot 10^5$ Pa, preferably higher than $10 \cdot 10^5$ Pa.

Further tests have then been carried out in order to see whether the simultaneous use of rare earth metal and refractory material or precursor thereof, in presence of water vapor could improve combustion characteristics as such, for example reduces the formation of $NO_x$, the formation of soot and carbon particles, the formation of $SO_2$, etc.

It was observed that when adding to the rare earth catalytic system of the system disclosed in U.S. Pat. No. 4,844,028 or in U.S. Pat. No. 4,991,395 with a minimum amount of refractory nano particles, such as aluminosilicate particles, preferably wolframite particles, a better $NO_x$ reduction could be achieved than with the system disclosed in U.S. Pat. No. 4,844,028 or in U.S. Pat. No. 4,941,395.

Furthermore, the presence of said nano particles of refractory material was also reducing possible corrosion problems or risks.

Tests have been made with the devices as shown in FIGS. 1, 5 to 8, except that no primary $NO_x$ reducing catalytic coating was provided in the different parts of the engine. Said test have shown that a $NO_x$ reduction could be achieved, after a few hours of working. The number of hours for obtaining a reasonable $NO_x$ reducing effect was less than the number of hours required for obtaining a $NO_x$ reduction effect when using substantially only a rare earth compound or mixture.

In the devices of FIGS. 1, 5 to 8, the rate of cerium admission is function of the amount of fuel introduced in the combustion chamber.

According to a possible embodiment of said devices, said devices are connected to a control means adapted for example to introduce in the combustion chamber cerium and/or europium when the $NO_x$ average content (for example average calculated on a combustion period of 1 hour) and to stop the introduction of cerium and/or europium in the combustion chamber when the $NO_x$ average content is below or about a minimum value.

In the devices of FIGS. 1, 5 to 8, it can be of interest to have an air admission, especially a controlled fresh air admission in flue gases. Such a controlled air admission is for example in the device of FIG. 1 an air admission valve 30 connected to a pipe 31 on which a fan 32 is mounted. Said fresh air is admitted in the exhaust gases manifold 7. The admission of fresh air can be controlled for example in function of the richness of the flue gases, and/or so as to have always a substantially stoechiometric flue gases and/or so as to reduce the temperature of the exhaust gases.

In the device of FIG. 5, two air admissions are provided, a first similar to that of the device of FIG. 1, the second adapted for admitting fresh air in the exhaust recycling pipe 21. As a fan 22 is already mounted on said pipe 21, it is possible to use a valve 33 or a controlled valve for the admission or sucking of fresh air in the pipe 21.

Figure 9:
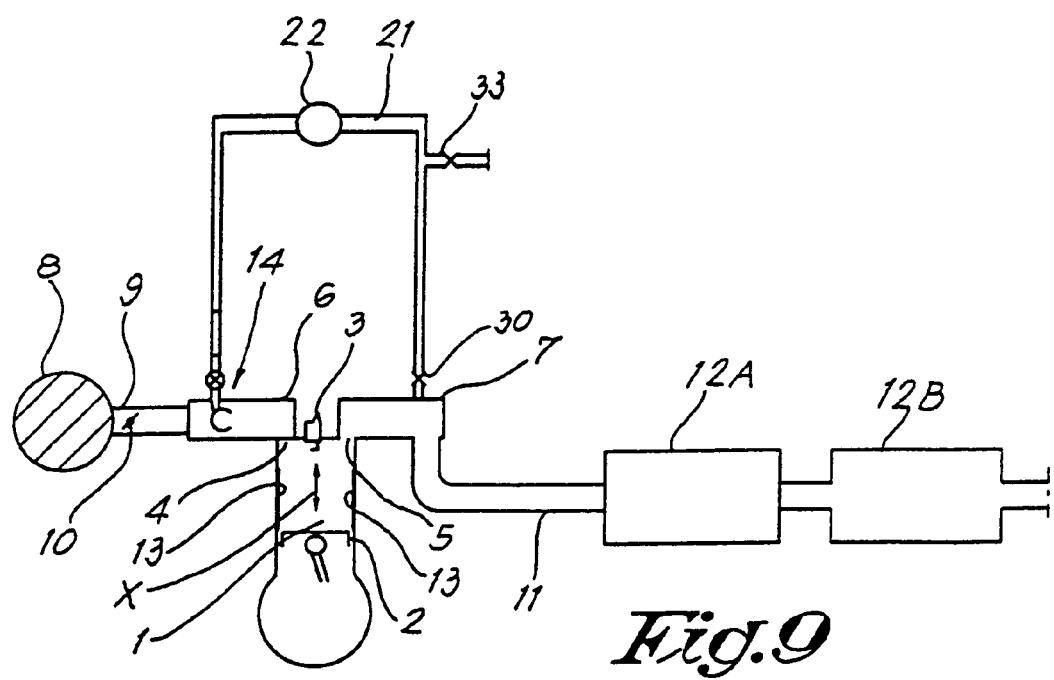

In the FIG. 9, the device is provided with a pipe for recycling exhaust gases from the exhaust manifold to the intake manifold. Said recycling is for example made by a pipe 21 with a fan 22 and an air admission valve 33. Possibly, instead of being recycled through the ovoid chamber 16, the recycled gas can be recycled in the intake manifold not via the ovoid chamber. In case the exhaust recycling pipe 21 is provided with a coating cerium/europium+refractory material, it is possible to have an embodiment without ovoid chamber.

The precoating of the combustion chamber can be operated in various manner.

Possible examples are given hereafter:

A combustion motor which have already been used for 25,000 km was treated as follows:

each combustion chambers have been treated with a decoking agent for removing the coke deposited on the wall of the chamber. Such a decoking agent is introduced in the combustion chamber through the opening obtained by removal of the spark plugs. After a sufficient contact time with the decoking agent, the coke is removed and the combustion chamber are cleaned and dried.

Each combustion chambers have then been treated with a liquid or viscous composition containing at least a first catalytic material or a precursor thereof. Said liquid or viscous composition is introduced in the combustion chamber via the opening of the spark plugs. The piston of each combustion chamber is moved so that all the wall of the combustion chamber are provided with a layer of liquid or viscous material.

The excess of liquid or viscous material is removed from each combustion chamber.

After placement of the spark plug, the motor is used so as to submit the coating layer to a high temperature and to a high pressure.

The efficiency of the catalyst coating is now analyzed, for example visual analysis, $NO_x$ reduction analysis, etc.

In this method, the liquid or viscous material contains for example a metal or a rare earth metal or salts thereof. For example, the liquid or viscous material contains Rh, Pt, Pd, Ce, Pr, La, Y, Yb, etc. particles or compounds, or mixtures thereof. The liquid or viscous material is for example an oily or wax based material. The active particle/compound content in the liquid or viscous material is for example at least 20% by weight, advantageously at least 35% by weight, for example from 50 up to 85% by weight. The compounds can be organometallic compounds, such as any organometallic compounds disclosed in EP 1,215,272, the content of which is incorporated in the present specification by reference. When using solid particles, said particles are preferably nanoparticles, possibly agglomerated so as to form agglomerates with a particle size of less than 10 μm. Possibly, the solid particles can be coated with an adhesive or mixed with aluminum particles.

According to a possible embodiment, the oily or wax composition is applied on heated wall of the combustion chambers, so as to facilitate the deposit of catalyst material (for example by evaporation of one or more solvents present in the composition).

In another example, instead of using a oily or wax based material for coating, fine powder was used. Said powder was sprayed in the combustion chamber with the piston moving, so that all the wall of the combustion chamber are coated with a powdery layer. The walls of the combustion chamber are then advantageously preheated so as to ensure a better coating or adherence of the particles. The spraying of the powder is advantageously carried out in the absence of coke or coke precursor.

When a new motor is provided with a reactivation system for a catalyst present in the combustion chamber, the first catalyst layer is advantageously deposited during the manufacture of the combustion chamber or just after.

In case, such a primary catalyst layer is not deposited during the manufacture process of the combustion chamber, said layer is deposited after the building of the motor.

For new motor, it has been observed that prior the coating with the first catalyst layer, it was interesting to pretreat or pre-run the combustion chamber while moving the piston with or without additives. Such a pretreatment is for example operated by placing a lubricant (liquid, wax, powder, such as graphite powder, spherical graphite powder) in the combustion chamber. After said pretreatment, the combustion chamber is advantageously washed or cleaned so as to remove the remaining lubricant or powder present in the combustion chamber.

In the device of FIGS. 1, 5 to 9, the admission of cerium particles is made in the intake manifold. In possible embodiments, it is possible to make such an admission in the exhaust manifold, in the exhaust recycling pipe, in the exhaust pipe or in the intake pipe 9. However, in the preferred embodiment, the cerium admission is made in the intake manifold and/or in the exhaust recycling pipe, most preferably in the intake manifold.

While in the devices of the invention shown in the attached drawings, cerium is admitted with refractory material (clays), it is possible to make separate admission, a first admission means for admitting cerium particles in the intake air and a second admission for admitting refractory material (such colloidal clay) in the intake air.

According to further possible embodiment, walls in contact with hot flue gases, such as walls of the combustion chamber, wall of the outlet manifold, wall of the exhaust pipe, wall of the exhaust recycling means are provided with a refractory coating or layer.

Figure 10:
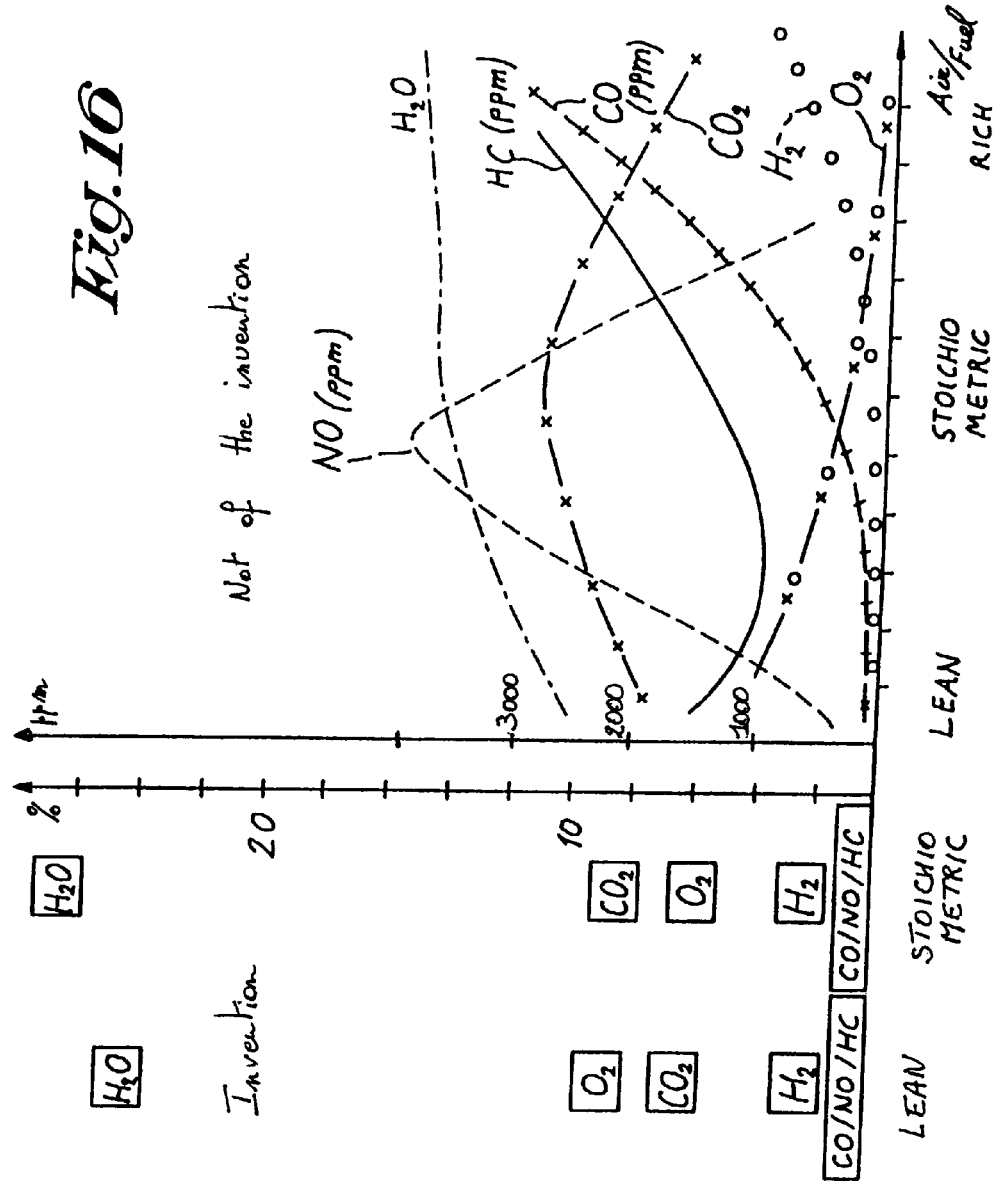

In the example, the catalyst used for regeneration or for the rejuvenation or for the treatment of the primary catalyst coating comprises cerium. In other possible examples, the catalyst comprises europium and refractory material, such clay, hydrated clay particles. In still another example, the catalyst comprises a refractory material and ytterbium and/or praseodymium FIG. 10 is a schematic view of a turbine 50 comprising a rotating rod or axle 51 bearing fin 52 for sucking air and pushing said air in the turbine chambers 53,54, fins 55 for compressing air and forming the primary air flow towards the main combustion chamber 54A, fins 56 for rotating the axle 51 due to the gas expansion of the combustion gases in the combustion chamber. The exhaust gas flowing through the fins 56 are mixed with the secondary air flow issuing from the chamber 53. The turbine is provided with a fuel admission 57 for admitting fuel into the combustion chamber, and possibly with a fuel admission 58 for enabling a post combustion of the exhaust gases of the combustion chamber mixed with air of the secondary air flow.

If required, the turbine can be provided with a exhaust recycling system, such as a pipe 59.

Various parts of the turbine can be provided with a primary coating 60. Such primary coating is shown in dashed lines. For example the inner wall 61 of the turbine or a portion thereof in contact with the second air flow and with the exhaust gases, and/or wall of the combustion chamber 54A or a portion thereof, and/or the fins 52 or a portion thereof, and/or fins 55 or a portion thereof, and/or fins 56 or a portion thereof, and/or wall of the recycling pipe 59 or a portion thereof and/or walls of the post combustion chamber 62 or a portion thereof are provided with such a primary coating. Most preferably, only parts in contact with hot flue gases are coated with such a primary coating.

The regeneration or rejuvenation or treatment of the primary catalyst coating can be carried out by admitting cerium and/or europium and/or ytterbium and/or praseodymium particles and refractory particles before the fins 52, in the primary air flow (portion 54B of the chamber 54, before the combustion chamber 54A) and/or in the combustion chamber 54A and/or in the post combustion chamber 62.

Figure 2:
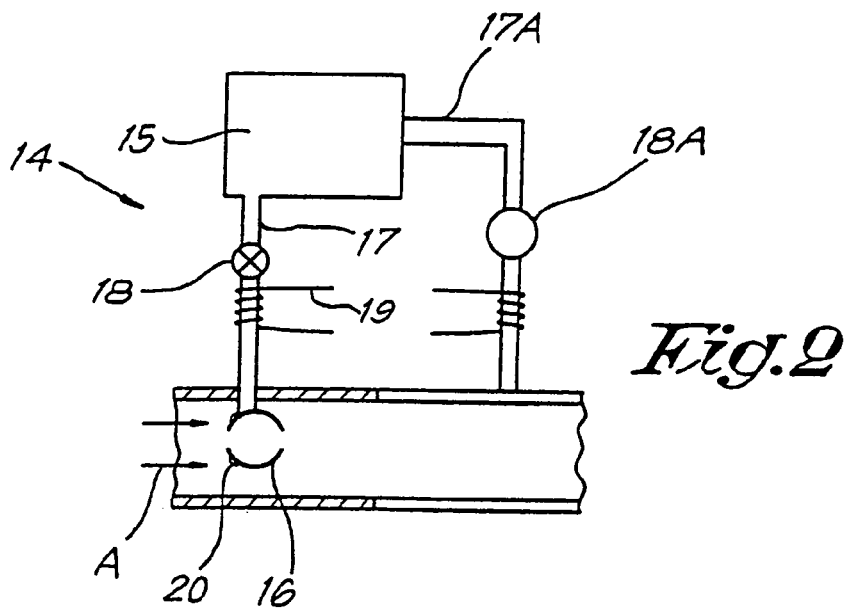
FIG. 2 is an enlarged view of a detail of the motor of FIG. 1.

The systems for admitting cerium and/or europium and/or ytterbium and/or praseodymium particles and/or refractory particles are indicated schematically with numerals 63,64, 65,66,67. Said systems are advantageously a system similar to that shown in FIG. 2.

The turbine can be provided with different specific admission systems for admitting in different places catalyst particles.

According to a possible embodiment, the admission of cerium/europium particles and of refractory materials (such as clay particles) is made separately. For example, the refractory material or clays (for example hydrated clay) is admitted before the combustion chamber 54A, such as in the chamber 54B and/or before or after the fins 52, while the cerium/europium/ytterbium/praseodymium compound is admitted in the combustion chamber 54A and/or in the post combustion chamber 62.

According to still a possible embodiment, the refractory material is admitted in the combustion chamber, while the cerium/europium/ytterbium/praseodymium compound is admitted in the post combustion chamber. Still according to another possible embodiment, the cerium/europium/ytterbium/praseodymium compound is admitted in the combustion chamber, while the refractory material is admitted in the post combustion chamber.

However, preferably, an air/water vapor mixture containing cerium or europium and refractory material (such as clays) is admitted in the combustion chamber and in the post combustion chamber, if any. It has been observed that good result could be obtained when introducing cerium and/or europium and/or ytterbium and/or praseodymium particles together with refractory material (such as clay, wolframite) in the combustion chamber or in the compressed air (54B) entering in the combustion chamber. Said admission is preferably made in presence of water vapor.

Figure 11:
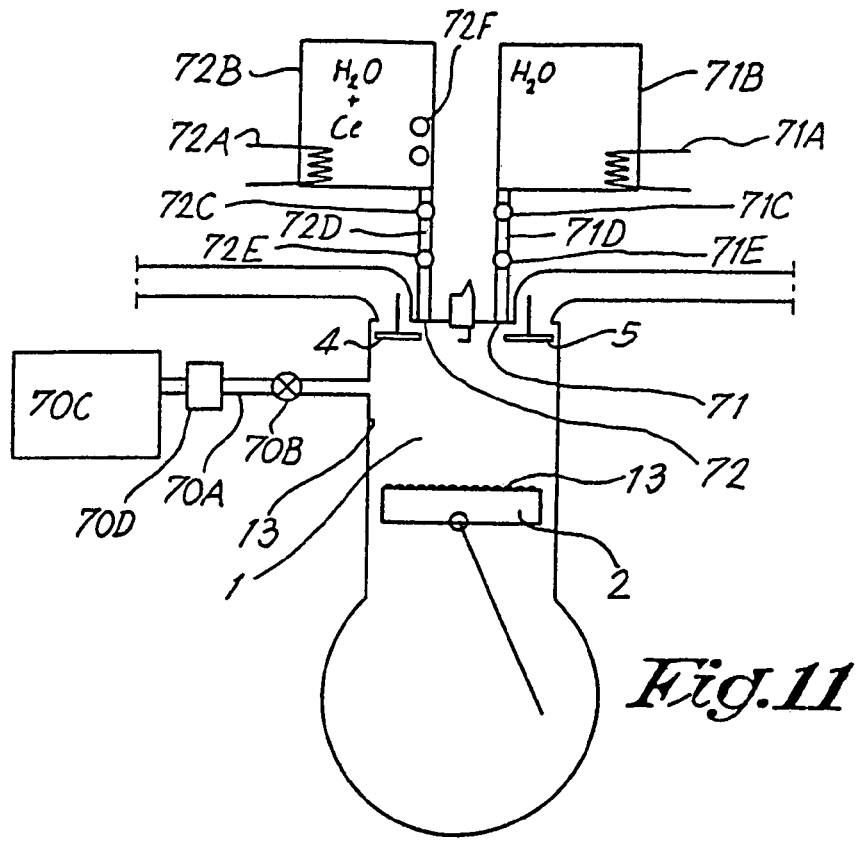
FIG. 11 is a schematic view of still a further embodiment.

In the embodiment of FIG. 11, the combustion chamber 1 is provided as in the embodiment of FIG. 1 with a coating 13 comprising lathanides and/or cerium and/or europium and/or ytterbium and/or praseodymium. Such a coating was also present on the surface of the piston 2.

The combustion chamber 1 is provided with injection means 70, 71,72 for injecting in the combustion chamber fuel or petrol, water and water containing cerium and/or europium and/or ytterbium and/or praseodymium.

The combustion chamber is provided with an inlet opening with a controlled valve 4 and an exhaust opening with a controlled valve 5.

The injection means 70 for injecting (for example by spraying or pulverizing) fuel or petrol in the chamber 1 or for introducing a gaseous fuel in the chamber 1 is connected via a pipe 70A with a controlled valve 70B to a tank or reservoir 70C. A means 70D such as a pump enables to give sufficient pressure to the fuel for its injection in the chamber. The injection of fuel is advantageously controlled, so that some fresh fuel is injected during the combustion at different moments or combustion stages.

The injection means 71 is intended for injecting water or water vapor (preferably hot water, such water with a temperature of 30–90° C., especially water with a temperature of about 40 to 75° C.) in the combustion chamber during an air intake. The water is heated by a heating means 71A (electrical heating means, heater using the heat of the motor cooling agent, heater using the heat of the flue gases, etc) in a tank or reservoir 71B. The hot water is pumped by the controlled pump 71C for flowing in the pipe 71D provided with a controlled valve 71E.

The injection means 72 is intended for injecting water or water vapor containing cerium and/or europium and/or ytterbium and/or praseodymium (preferably hot water, such water with a temperature of 30–90° C., especially water with a temperature of about 40 to 75° C.) in the combustion chamber during an air intake. The water is heated by a heating means 72A (electrical heating means, heater using the heat of the motor cooling agent, heater using the heat of the flue gases, etc) in a tank or reservoir 72B containing particles, beads, pieces, comprising cerium and/or europium 72F. The hot water is pumped by the controlled pump 72C for flowing in the pipe 72D provided with a controlled valve 72E.

The injection of water vapor or hot water (free of cerium/europium/ytterbium/praseodymium) via the pipe 71, as well as the injection of water vapor or hot water containing cerium/europium ytterbium/praseodymium can be controlled, so that the requested amount of cerium/europium ytterbium/praseodymium, as well the necessary water amount is present in the combustion chamber for enabling a correct $NO_x$ reduction. For example, when the catalyst coating has not to be regenerated, only water or water vapor and fuel are injected in the combustion chamber.

For avoiding possible freezing problems of the water, various additive can be added in the reservoir 72B and 71B, such as alcohol (alcohol means in the present specification compounds with a monoalcohol function, with two or more alcohol fonctions, such as diols, polyalcohols, etc.) such as ethanol and/or methanol, glycol, ethylene glycol, diethylene glycol, propylene glycol, etc. and mixtures thereof. The use of alcohol, such as ethanol, is quite interesting as it enables to use the alcohol as useful fuel source. The content of additive in the water is for example comprised between 2 and 50%, or even more, but is advantageously comprised between 5 and 20% by weight (for example an aqueous medium containing 8 to 15% volume ethanol.

Figure 12:
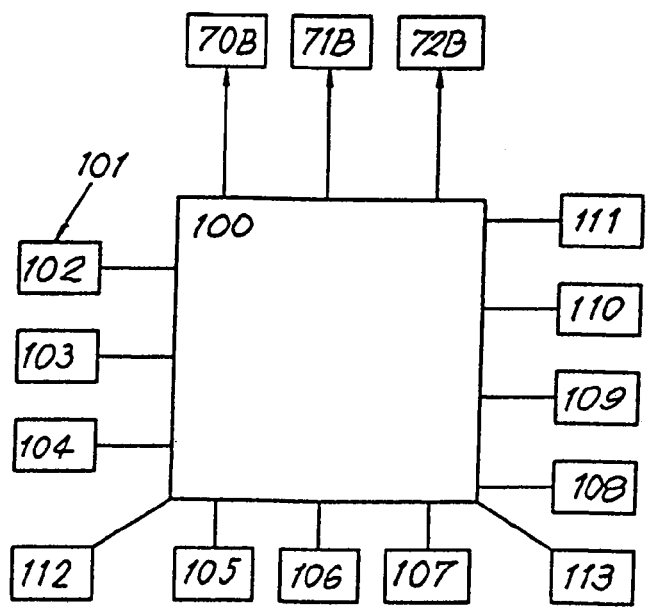
FIG. 12 is a schematic view of a possible control unit.
Figure 13:
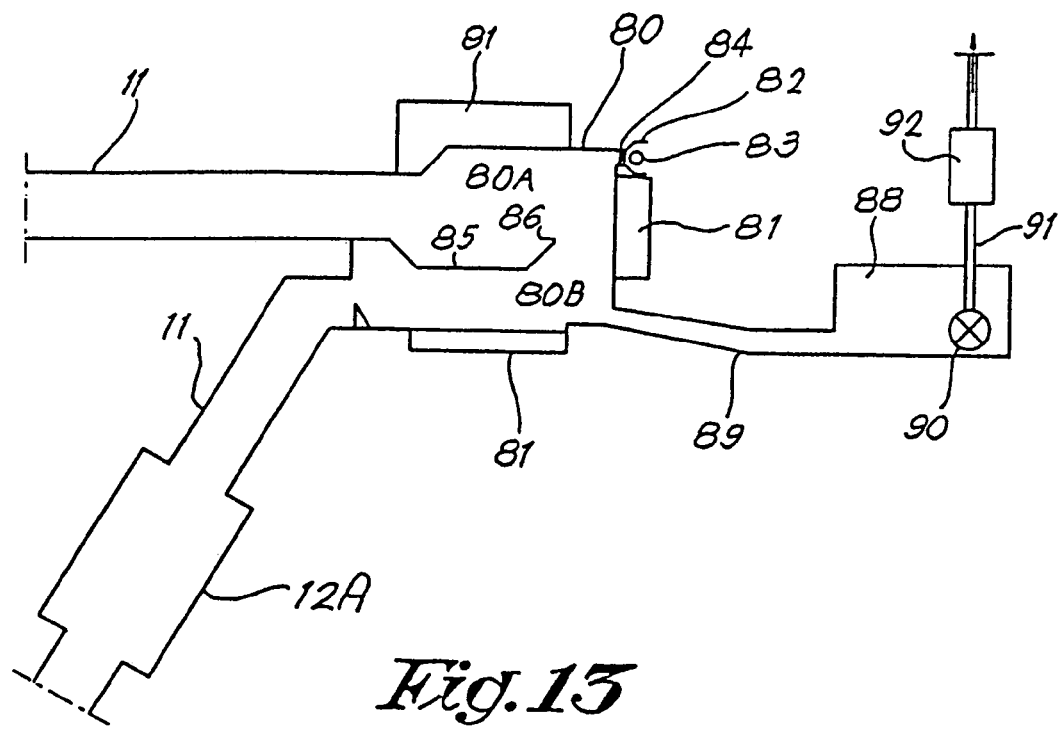
FIG. 13 is a view of a system for condensing water of the flue gases.

FIG. 12 is a schematic view of a central unit for controlling the combustion. Said central unit 100 receives from various sensors 101 (possibly via other central unit) information about various parameters, such as

- temperature of the hot water 102 (in the tank 71B and the reservoir 72B); for example as long as the temperature has not reached a minimal temperature, the unit controls the working so that no water injection is made in the combustion chamber;
- temperature of the cooling agent of the motor 103; for example, as long as the temperature of the cooling agent is lower than a minimum temperature (for example 75° C.), the central unit controls the injection of water and of a minimum amount of cerium/europium/ytterbium/praseodymium;
- fuel consumption 104; for example in case the fuel consumption is reduced to less than a predetermined value, no cerium/europium/ytterbium/praseodymium is injected in the combustion chamber and/or in case the fuel consumption is higher than a predetermined value, at least a minimal amount of cerium/europium is injected in the combustion chamber;
- speed variation or acceleration or gear change or variation of the rotation speed 105, for example, as soon as a variation of more than a predetermined value is determined within a time period, at least a minimum amount of cerium/europium is injected in the combustion chamber;
- deceleration or motor brake 106; for example when a deceleration or motor brake is determined, water or water vapor with a minimum amount of cerium/europium is injected in the combustion chamber so as to provide a minimum regeneration of the catalyst coating, prior to the following acceleration;
- speed 107, for example as long as the speed is lower than a minimum value, water or water vapor and at least a minimum amount of cerium/europium are injected is the combustion chamber;
- fuel characteristics 108;
- $NO_x$ content in the flue gases (109); for example As long as the $NO_x$ mobile average content on a period of 15 minutes is lower than a predetermined threshold value (M, for example corresponding to 1.3× the requested average RA), no regeneration of the catalyst coating is operated by admission of cerium and/or europium compound in the combustion chamber. When the $NO_x$ mobile average content on a period of 15 minutes is higher than the predetermined threshold value (M, for example corresponding to 1.3× the requested average RA), regeneration of the catalyst coating is operated by admission of cerium and/or europium compound in the combustion chamber. Said regeneration is for example carried out up to reaching a minimum threshold value (m, for example a value corresponding to about 0.7× the requested average RA).
- Brake 110; for example as soon as a braking is carried out, more water or water vapor is injected in the combustion chamber
- Airflow 111,
- Water content 112 of the reservoir used for feeding the cerium/europium/ytterbium/praseodymium in the combustion chamber
- Water content of the water free of additive to be directly injected in the combustion chamber
- Etc.

The control unit 100 controls for example the valves 70B,71B and 72B, as well as can emit signal corresponding to an efficient working or to a defect of working.

As, the water content in the flue gases is quite high, it is advantageous to provide the exhaust pipe with a system for collecting at least part of said water vapor.

The condensation of water vapor present in the exhaust gases is advantageous,

- as it enables at the same moment the formation of larger particles (i.e. easier to be trapped),
- as it creates a sucking of the gases, i.e. a better removal of the flue gases present in the combustion chamber, and
- as it is a source of water, which can be reinjected during the combustion cycle, possibly after a filtration step.

The flue gases are conducted via the pipe 11 towards a filtering means 12A. Before filtering the flue gases, the flue gases pass with a condensation chamber 80, the outer faces being for example cooled by air, for example by the air flow created by the movement of the car. For increasing the cooling effect, fins 81 can be mounted on said outer faces.

The chamber 80 comprises possibly an opening provided with a controllable closing valve or with a one way valve 82 for enabling the entry of fresh air when the depression created in the chamber 80 is too high (for example sufficient for displacing a closing ball or seal 83 against the action of a spring 84). Such an entry of fresh air is advantageous for reducing the temperature of the flue gases, whereby improving the water condensation.

The chamber has an upper part 80A and a lower part 80B. The chamber 80A is provided with a collector 85 with an edge 86 adapted for enabling the over flow of water towards the chamber 80B, when the collector 85 is full. Said overflow of water forms a kind of water curtain, which is advantageous for trapping solid particles. Said water overflow and the water condensed in the part 80B is collected in the collector 87 connected to an intermediate reservoir 88 via a pipe 89, from which water is pumped by the pump 90 towards the reservoir 14 or 72B or 71B via the pipe 91 provided with a filter 92.

Such a condensation step is advantageous, as it enables also the removal of the flue gases of some $CO_x$, $SO_x$, $NO_x$, sulfur containing compounds, Phosphate, combinations thereof, etc. and other compounds which are water soluble.

Water for one of more of said reservoir can also be collected from the air conditioning system of the car or from a window for example during a heavy rain.

Reference is also made to U.S. Pat. No. 5,494,015 (the content of which is incorporated in the present specification by reference). Said document discloses a hydraulic pneumatic restrictor suitable for the admission of fuel. This system can also be used for the admission of water and/or water containing cerium and/or europium.

What I claim is:

1. Process of combustion of a combustible material in a combustion chamber associated at least with an admission means conducting and admitting an oxygen containing gas in the combustion chamber and exhaust means exhausting combustion chamber out of the combustion chamber and conducting said exhaust flue gases at least partly towards an outlet, in which:

at least one surface of an element selected from the group consisting of the combustion chamber, admission means in contact with flue gases and combinations thereof is at least partly provided with a primary $NO_x$ reducing catalyst, said primary $NO_x$ reducing catalyst being deposited in less than 24 hours when the primary $NO_x$ reducing catalyst is deposited in presence of combustion gases with an average temperature of more than 400° C., whereby said primary $NO_x$ reducing catalyst is present in an effective amount for ensuring a first average reduced $NO_x$ content in the flue gases, said average being measured for a combustion time of one hour, and said primary $NO_x$ reducing catalyst is intermittently treated with an effective amount of a composition containing at least one atom selected from the group consisting of cerium, europium, ytterbium, praseodymium and mixtures thereof, in presence of at least a gaseous medium comprising at least a gas selected from the group consisting of water vapor, combustion gases and mixtures thereof, at a temperature higher than 200° C., whereby said primary $NO_x$ reducing catalyst is treated for maintaining an average reduced $NO_x$ content in the flue gases lower than 5 times the first average reduced $NO_x$ content.

2. The process of claim 1, in which said primary $NO_x$ reducing catalyst is intermittently treated with an effective amount of said composition for maintaining an average reduced $NO_x$ content within the range 0.3 to 3 time the first average reduced $NO_x$ content.

3. The process of claim 1, in which the treatment of the primary $NO_x$ reducing catalyst is operated in presence of at least a hydrated aluminum silicate.

4. The process of claim 1, in which said primary $NO_x$ reducing catalyst is intermittently treated with an effective amount of a composition comprising at least one atom selected from the group consisting of cerium, europium and mixture thereof, said effective amount being selected so as to avoid at the outlet substantially any emission of nanoparticles comprising at least one atom selected from the group consisting of cerium, europium, ytterbium, praseodymium and mixtures thereof.

5. The process of claim 1, in which the primary $NO_x$ reducing catalyst forms a coating of at least a portion of an inner wall of the combustion chamber.

6. The process of claim 1, in which the primary $NO_x$ reducing catalyst forms a coating of at least a portion of an inner wall of the combustion chamber, said coating consisting of adjacent catalytic spots.

7. The process of claim 1, in which the combustion gases flowing out of the combustion chamber are submitted to a treatment selected from the group consisting of filtering, washing, treatment in a reactor, absorbing, trapping and combinations thereof, before being exhausted via an outlet, and in which at least one element selected from the group consisting of filtering means, washing means, means conducting the flue gases from the combustion chamber to the filter, means conducting the flue gases from the combustion chamber to the washing means, and combinations thereof is provided at least partly with a $NO_x$ reducing catalyst coating.

8. The process of claim 1, in which the primary $NO_x$ reducing catalyst comprises at least one atom selected from the group consisting of Ce, Pt, Pd, Cu, W, Pr, Sc, Si, Ga, Ru, Mo, Ni, Ti, Co, Rh, Mg, Ca, La, Eu, Y, Yb, Si and mixtures thereof.

9. The process of claim 1, in which a means determines at least roughly the $NO_x$ content of the combustion flue gases at different times and in which said means controls the treatment of the primary $NO_x$ reducing catalyst when the determined $NO_x$ content is above a threshold value.

10. The process of claim 1, in which a means determines at least roughly the $NO_x$ content of the combustion flue gases at different times and in which said means stops the treatment of the primary $NO_x$ reducing catalyst when the determined $NO_x$ content is lower than a threshold value.

11. The process of claim 1, in which the primary $NO_x$ reducing catalyst forms a coating having substantially uniform characteristics.

12. The process of claim 1, in which the treatment of the primary catalyst coating is carried out by contacting said primary $NO_x$ reducing catalyst coating with a gaseous medium containing at least one additive selected from the group consisting of cerium containing compounds, europium containing compounds, compounds containing cerium and europium, cerium containing particles, europium containing particles, particles containing cerium and europium, ytterbium containing compounds, praseodymium containing compounds, compounds containing cerium and ytterbium, ytterbium containing particles, praseodymium containing particles, particles containing cerium and ytterbium, particles containing cerium and praseodymium, and mixtures thereof, said contact treatment being carried out at least partly at a temperature higher than 400° C.

13. The process of claim 1, in which a compound selected from the group consisting of compounds containing cerium, compounds containing europium, compounds containing cerium and europium, compounds containing ytterbium, compounds containing praseodymium, compounds containing cerium and ytterbium, compound containing cerium and praseodymium and mixtures thereof is contacted with a gaseous medium containing at least water vapor so as to form a gaseous medium containing at least one element selected from the group consisting of cerium, europium and mixtures thereof said gaseous medium being conducted in the combustion chamber for treating the primary $NO_x$ reducing catalyst.

14. The process of claim 1, in which a compound selected from the group consisting of compounds containing cerium, compounds containing europium, compounds containing cerium and europium, compounds containing ytterbium, compounds containing praseodymium, compounds containing cerium and ytterbium, compound containing cerium and praseodymium and mixtures thereof is contacted with a gaseous medium containing water vapor having a temperature comprised between 20° C. and 90° C., so as to form a gaseous medium containing at least one element selected from the group consisting of cerium, europium, ytterbium, praseodymium and mixtures thereof, said gaseous medium being then conducted in the combustion chamber in an effective amount for the intermittent treatment of the primary $NO_x$ reducing catalyst.

15. The process of claim 1, in which a compound selected from the group consisting of compounds containing cerium, compounds containing europium, compounds containing cerium and europium, compounds containing ytterbium, compounds containing praseodymium, compounds containing cerium and ytterbium, compound containing cerium and praseodymium and mixtures thereof is contacted with an aqueous medium, and in which aqueous medium containing at least one element selected from the group consisting of cerium, europium, ytterbium, praseodymium and mixtures thereof is admitted in the combustion chamber for treating the primary $NO_x$ reducing catalyst.

16. The process of claim 1, in which the treatment of the primary $NO_x$ reducing catalyst is further controlled in function of at least one parameter selected from the group consisting of charge or load of the combustion motor, combustible flow, air flow, speed of the combustion motor, air/combustible mixture, speed variation level, gear variation, temperature, acceleration, brake, and combinations thereof.

17. The process of claim 1, in which the intermittent treatment of the primary $NO_x$ reducing catalyst is carried out by successive admissions in the combustion chamber of an aqueous medium comprising at least one atom selected from the group consisting of cerium, europium, ytterbium, praseodymium and mixtures thereof, and in which an aqueous medium substantially free of cerium and europium and ytterbium and praseodymium is admitted in the combustion chamber between two admissions in the combustion chamber of an aqueous medium comprising at least one atom selected from the group consisting of cerium, europium, ytterbium, praseodymium and mixtures thereof.

18. The process of claim 1, in which the intermittent treatment of the primary $NO_x$ reducing catalyst is carried out by successive admissions in the combustion chamber of an aqueous medium comprising at least one atom selected from the group consisting of cerium, europium, ytterbium, praseodymium and mixtures thereof and in which a medium substantially free of cerium and europium selected from the group consisting of aqueous medium, alcohol medium, glycol medium and combinations thereof is admitted in the combustion chamber between two admissions in the combustion chamber of a medium selected from the group consisting of water vapor containing cerium, water vapor containing europium, water containing cerium, water containing europium, alcohol medium containing cerium, alcohol medium containing europium, glycol medium containing cerium, glycol medium containing europium, water vapor containing ytterbium, water vapor containing praseodymium, water containing ytterbium, water containing praseodymium, alcohol medium containing ytterbium, alcohol medium containing praseodymium, glycol medium containing ytterbium, glycol medium containing praseodymium and combinations thereof.

19. The process of claim 1, in which the combustion chamber is a combustion chamber of an internal combustion engine.

20. The process of claim 1, in which the combustion is operated in presence of nanoparticles of a hydrated aluminum silicate, the weight ratio (rare earth containing compounds)/(hydrated aluminum silicate) being lower than 50.

21. The process of claim 1, in which a compound selected from the group consisting of compounds containing cerium, compounds containing europium, compounds containing cerium and europium, compounds containing ytterbium, compounds containing praseodymium, compounds containing cerium and ytterbium, compound containing cerium and praseodymium and mixtures thereof is contacted with a gaseous medium containing at least water vapor so as to form a gaseous medium containing at least one element selected from the group consisting of cerium, europium, ytterbium, praseodymium and mixtures thereof, whereby said gaseous medium containing at least one compound comprising at least one atom selected from the group consisting of cerium, europium, ytterbium, praseodymium and mixtures thereof is conducted in the combustion chamber for treating the primary $NO_x$ reducing catalyst.

22. The process of claim 1, in which combustion flue gases are partly recycled in the combustion chambre via a recycling conducting means and in which the recycling means conducting flue gases towards the combustion chamber is at least partly provided with a $NO_x$ reducing catalyst coating.

23. The process of claim 22, in which the combustion gases recycled in the combustion chamber are at least partly submitted to a treatment selected from the group consisting of filtration, washing, absorption, conversion, trapping and combinations thereof.

24. The process of claim 1, in which the primary $NO_x$ reducing catalyst is a coating deposited under controlled conditions.

25. The process of the claim 24, in which the primary $NO_x$ reducing catalyst coating is after being deposited submitted to at least one treatment step selected among the group consisting of heating step at a temperature higher than 200° C., a washing step, a gas blowing step, a control step of the efficiency of the coating, a control step of the properties of the coating, a control step of characteristics of the coating, and combinations thereof.

26. The process of claim 1, in which the combustion is operated in presence of at least one compound selected from the group consisting of water vapor, glycol, alcohol, aldehyde and mixtures thereof.

27. The process of claim 26, in which the combustion is operated in presence of at least one compound selected from the group consisting of water, water vapor, glycol, alcohol, aldehyde and mixtures thereof, said compound being directly injected in the combustion chamber.

28. A means for introducing an element selected from the group consisting of cerium and europium into a gas flow intended to be introduced in a combustion chamber, said means being characterized by a chamber with a substantially ovoid form, the inner wall thereof being coated at least partly with a composition containing at least one element selected from cerium, europium and mixture thereof, said substantially ovoid chamber being provided with a first opening intended to be connected with a gas admission means of the combustion chamber, with a second opening for introducing an aqueous medium in the substantially ovoid chamber, and with a third opening for the admission in the substantially ovoid chamber of a gas, whereby enabling a flow of said gas in the substantially ovoid chamber between said third opening and first opening.

29. The means of claim 28, which comprises a heating means.

* * * * *